(12) United States Patent
Xiao et al.

(10) Patent No.: US 12,744,600 B2
(45) Date of Patent: Sep. 22, 2026

(54) OPTICAL TRANSMISSION METHOD AND APPARATUS

(71) Applicant: Huawei Technologies Co., Ltd., Shenzhen (CN)

(72) Inventors: Kang Xiao, Nanjing (CN); Yannian Lou, Shanghai (CN); Juan Wei, Shanghai (CN); Dongsheng Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 18/759,251

(22) Filed: Jun. 28, 2024

(65) Prior Publication Data

US 2024/0356644 A1 Oct. 24, 2024

Related U.S. Application Data

(63) Continuation of application No. PCT/CN2022/140169, filed on Dec. 19, 2022.

(30) Foreign Application Priority Data

Dec. 30, 2021 (CN) ........................ 202111651329.0

(51) Int. Cl.
*H04B 10/25* (2013.01)
*H04B 10/50* (2013.01)
*H04B 10/63* (2013.01)

(52) U.S. Cl.
CPC ..... *H04B 10/25891* (2020.05); *H04B 10/501* (2013.01); *H04B 10/63* (2013.01)

(58) Field of Classification Search
None
See application file for complete search history.

(56) References Cited

U.S. PATENT DOCUMENTS 9,300,399 B2 * 3/2016 Campos ........... H04B 10/25751
9,438,348 B2 * 9/2016 Kakande ............ H04J 14/0307
(Continued)

FOREIGN PATENT DOCUMENTS

CN 103095373 A 5/2013
CN 107408991 A 11/2017
(Continued)

*Primary Examiner* — Jai M Lee
(74) *Attorney, Agent, or Firm* — Slater Matsil, LLP

(57) ABSTRACT

This application provides an optical transmission method and apparatus, and relates to the communication field. A first optical transmission apparatus includes a first circulator and a first receiving module. The first receiving module is connected to the first circulator. The first circulator is configured to receive a second unmodulated optical signal from a second optical transmission apparatus. The first receiving module is configured to receive a second modulated optical signal from the second optical transmission apparatus, and receive the second unmodulated optical signal from the first circulator. The second modulated optical signal is obtained by modulating a first unmodulated optical signal, the second unmodulated optical signal is used to perform coherence detection on the second modulated optical signal, and the third unmodulated optical signal is an optical signal provided by the first optical transmission apparatus to the second optical transmission apparatus.

20 Claims, 10 Drawing Sheets

(56) References Cited

U.S. PATENT DOCUMENTS

| | | | | |
|---|---|---|---|---|
| 9,654,219 | B2 * | 5/2017 | Li | H04B 10/503 |
| 10,735,097 | B2 * | 8/2020 | Jia | H04B 10/2587 |
| 11,228,371 | B2 * | 1/2022 | Morsy-Osman | H04J 14/06 |
| 11,394,466 | B2 * | 7/2022 | Campos | H04J 14/04 |
| 2019/0229811 | A1 | 7/2019 | Gupta et al. | |

FOREIGN PATENT DOCUMENTS

| | | | |
|---|---|---|---|
| CN | 107466448 | A | 12/2017 |
| CN | 109247063 | A | 1/2019 |
| CN | 110350982 | A | 10/2019 |
| CN | 110868258 | A | 3/2020 |
| CN | 111049585 | A | 4/2020 |
| CN | 114448519 | A | 5/2022 |
| EP | 2744125 | A1 | 6/2014 |
| EP | 2797337 | A2 | 10/2014 |

* cited by examiner

OPTICAL TRANSMISSION METHOD AND APPARATUS

CROSS-REFERENCE TO RELATED APPLICATIONS

This application is a continuation of International Application No. PCT/CN2022/140169, filed on Dec. 19, 2022, which claims priority to Chinese Patent Application No. 202111651329.0, filed on Dec. 30, 2021. The disclosures of the aforementioned applications are hereby incorporated by reference in their entireties.

TECHNICAL FIELD

Embodiments of this application relate to the communication field, and in particular, to an optical transmission method and apparatus.

BACKGROUND

In a communication system, a first optical transmission apparatus provides a third unmodulated optical signal to a second optical transmission apparatus, so that the second optical transmission apparatus performs modulation based on the third unmodulated optical signal to obtain a second modulated optical signal. Then, the first optical transmission apparatus receives the second modulated optical signal from the second optical transmission apparatus, and performs coherence detection on the second modulated optical signal by using local oscillator light. The local oscillator light and the third unmodulated optical signal are obtained by separating a same optical signal on the first optical transmission apparatus side.

However, the foregoing communication system has large phase noise.

SUMMARY

This application provides an optical transmission method and apparatus, to reduce or even eliminate phase noise.

To achieve the foregoing objective, the following technical solutions are used in embodiments of this application.

According to a first aspect, embodiments of this application provide a first optical transmission apparatus. The apparatus includes a first circulator and a first receiving module. The first receiving module is connected to the first circulator. The first circulator is configured to receive a second unmodulated optical signal from a second optical transmission apparatus. The first receiving module is configured to receive a second modulated optical signal from the second optical transmission apparatus, and receive the second unmodulated optical signal from the first circulator. The second modulated optical signal is obtained by modulating a first unmodulated optical signal, the second unmodulated optical signal is used to perform coherence detection on the second modulated optical signal, the first unmodulated optical signal and the second unmodulated optical signal are obtained by separating a third unmodulated optical signal, and the third unmodulated optical signal is an optical signal provided by the first optical transmission apparatus to the second optical transmission apparatus.

In this way, transmission paths of the second modulated optical signal and the second unmodulated optical signal are the same or close. The second modulated optical signal is obtained by modulating the first unmodulated optical signal, and the first unmodulated optical signal and the second unmodulated optical signal are obtained by separating a same optical signal provided by the first optical transmission apparatus, that is, the third unmodulated optical signal. In addition, the transmission paths of the second modulated optical signal and the second unmodulated optical signal are the same or close. Therefore, the two signals do not have a frequency difference, and belong to coherent light. This reduces or even eliminates phase noise.

In a possible design, the first circulator is further connected to a second circulator. The second optical transmission apparatus includes the second circulator. That the first circulator is configured to receive a second unmodulated optical signal from a second optical transmission apparatus includes: receiving the second unmodulated optical signal from the second circulator, to receive the second unmodulated optical signal.

In a possible design, the first optical transmission apparatus in embodiments of this application further includes a first polarization control module. The first polarization control module is connected to the first circulator. The first polarization control module is configured to control polarization of the second unmodulated optical signal.

In a transmission process of the second unmodulated optical signal, a polarization state of the second unmodulated optical signal randomly rotates. This causes a coherence detection failure. The first polarization control module can convert the polarization state of the second unmodulated optical signal into an expected polarization state, thereby facilitating normal coherence detection.

In a possible design, that the second unmodulated optical signal is used to perform coherence detection on the second modulated optical signal includes: The second unmodulated optical signal on which polarization control is performed is used to perform coherence detection on the second modulated optical signal.

In this way, local oscillator light used for coherence detection is the second unmodulated optical signal on which polarization control is performed. Because the second unmodulated optical signal has high energy in an expected polarization state, impact of a random polarization state change is eliminated or reduced. Therefore, accuracy of coherence detection is improved.

In a possible design, the first polarization control module is further configured to control polarization of a first modulated optical signal. The first modulated optical signal is an optical signal sent by the first optical transmission apparatus to the second optical transmission apparatus.

In this way, when polarization control is also performed on the third unmodulated optical signal on a second optical transmission apparatus side, local oscillator light that is used by the second optical transmission apparatus to perform coherence detection and the first modulated optical signal have a same polarization state. After coherence detection, an electrical signal may be obtained, and target information may be obtained based on the electrical signal, without performing polarization demultiplexing processing. This reduces system power consumption and without independently designing a chip for performing polarization demultiplexing, thereby helping reduce system costs.

In a possible design, the first optical transmission apparatus in embodiments of this application further includes a first transmitting module. The first transmitting module is connected to the first circulator, and is configured to send the first modulated optical signal to the first polarization control module through the first circulator, so that the first optical transmission apparatus can provide the first optical modulated signal to the second optical transmission apparatus.

In a possible design, the first optical transmission apparatus is an optical transmission apparatus on an active antenna unit AAU side, and the second optical transmission apparatus is an optical transmission apparatus on a baseband unit BBU side. Alternatively, the first optical transmission apparatus is an optical transmission apparatus on a BBU side, and the second optical transmission apparatus is an optical transmission apparatus on an AAU side.

According to a second aspect, embodiments of this application provide a second optical transmission apparatus. The apparatus includes a second coupler, a second transmitting module, and a second circulator. The second transmitting module is connected to both the second coupler and the second circulator. The second coupler is configured to separate a third unmodulated optical signal into at least a first unmodulated optical signal and a second unmodulated optical signal. The third unmodulated optical signal is an optical signal provided by a first optical transmission apparatus. The second transmitting module is configured to send a second modulated optical signal to the first optical transmission apparatus. The second modulated optical signal is obtained by modulating the first unmodulated optical signal. The second circulator is configured to receive the second unmodulated optical signal from the second coupler, and send the second unmodulated optical signal to the first optical transmission apparatus. The second unmodulated optical signal is used for coherence detection of the second modulated optical signal.

In a possible design, the second circulator is further connected to a first circulator. The first optical transmission apparatus includes the first circulator. That the second circulator is configured to send the second unmodulated optical signal to the first optical transmission apparatus includes: sending the second unmodulated optical signal to the first circulator, to send the second unmodulated optical signal.

In a possible design, the second optical transmission apparatus in embodiments of this application further includes a second polarization control module. The second polarization control module is connected to the second coupler, and is configured to control polarization of the third unmodulated optical signal.

In a transmission process of the third unmodulated optical signal, a polarization state of the third unmodulated optical signal randomly rotates. This causes a coherence detection failure. The second polarization control module can convert the polarization state of the third unmodulated optical signal into an expected polarization state, thereby facilitating normal coherence detection.

In a possible design, that the second coupler is configured to separate a third unmodulated optical signal into at least a first unmodulated optical signal and a second unmodulated optical signal includes: separating the third unmodulated optical signal on which polarization control is performed into at least the first unmodulated optical signal and the second unmodulated optical signal.

In other words, the first unmodulated optical signal and the second unmodulated optical signal are also optical signals that have undergone polarization control.

In a possible design, the second coupler is further configured to separate the third unmodulated optical signal on which polarization control is performed into a fifth unmodulated optical signal. The fifth unmodulated optical signal is used for coherence detection of a first modulated optical signal, and the first modulated optical signal is an optical signal transmitted by the first optical transmission apparatus to the second optical transmission apparatus.

In this way, local oscillator light used for coherence detection is the fifth unmodulated optical signal on which polarization control is performed. Because the fifth unmodulated optical signal has high energy in an expected polarization state, impact of a random polarization state change is eliminated or reduced. Therefore, accuracy of coherence detection is improved.

In a possible design, the second optical transmission apparatus in embodiments of this application further includes a second receiving module. The second receiving module is connected to both the second circulator and the second coupler, and is configured to: receive the first modulated optical signal from the first optical transmission apparatus through the second circulator, and receive the fifth unmodulated optical signal from the second coupler, to implement coherence detection of the first modulated optical signal.

In a possible design, the second polarization control module is further connected to the second transmitting module, and is configured to control polarization of the second modulated optical signal.

In this way, when polarization control is also performed on the second unmodulated optical signal on a first optical transmission apparatus side, local oscillator light (that is, the second unmodulated optical signal) that is used by the first optical transmission apparatus to perform coherence detection and the second modulated optical signal have a same polarization state. After coherence detection, an electrical signal may be obtained, and target information may be obtained based on the electrical signal, without performing polarization demultiplexing processing. This reduces system power consumption and without independently designing a chip for performing polarization demultiplexing, thereby helping reduce system costs.

In a possible design, the second optical transmission apparatus in embodiments of this application further includes a third circulator. That a second polarization control module is connected to the second coupler, includes: The second polarization control module is connected to the second coupler through the third circulator, to implement unidirectional transmission of the third unmodulated optical signal. That the second polarization control module is further connected to the second transmitting module includes: The second polarization control module is further connected to the second transmitting module through the third circulator, to implement unidirectional transmission of the second modulated optical signal.

In a possible design, the first optical transmission apparatus is an optical transmission apparatus on an active antenna unit AAU side, and the second optical transmission apparatus is an optical transmission apparatus on a baseband unit BBU side. Alternatively, the first optical transmission apparatus is an optical transmission apparatus on a BBU side, and the second optical transmission apparatus is an optical transmission apparatus on an AAU side.

According to a third aspect, embodiments of this application provide an optical transmission method, and the method is applied to a first optical transmission apparatus. The apparatus includes a first circulator and a first receiving module. The first circulator is connected to the first receiving module. The method includes: The first circulator receives a second unmodulated optical signal from a second optical transmission apparatus; and the first receiving module receives a second modulated optical signal from the second optical transmission apparatus, and receiving the second unmodulated optical signal from the first circulator. The second modulated optical signal is obtained by modulating a first unmodulated optical signal, the second unmodulated optical signal is used to perform coherence detection on the second modulated optical signal, the first unmodulated optical signal and the second unmodulated optical signal are obtained by separating a third unmodulated optical signal, and the third unmodulated optical signal is an optical signal provided by the first optical transmission apparatus to the second optical transmission apparatus.

In a possible design, that the first circulator receives a second unmodulated optical signal from a second optical transmission apparatus includes: The first circulator receives the second unmodulated optical signal from a second circulator. The first circulator is further connected to a second circulator, and the second optical transmission apparatus includes the second circulator.

In a possible design, the optical transmission method in embodiments of this application further includes: A first polarization control module controls polarization of the second unmodulated optical signal. The first optical transmission apparatus further includes the first polarization control module, and the first polarization control module is connected to the first circulator.

In a possible design, that the second unmodulated optical signal is used to perform coherence detection on the second modulated optical signal includes: The second unmodulated optical signal on which polarization control is performed is used to perform coherence detection on the second modulated optical signal.

In a possible design, the optical transmission method in embodiments of this application further includes: The first polarization control module controls polarization of a first modulated optical signal. The first modulated optical signal is an optical signal transmitted by the first optical transmission apparatus to the second optical transmission apparatus.

In a possible design, the optical transmission method in embodiments of this application further includes: A first transmitting module sends the first modulated optical signal to the first polarization control module through the first circulator. The first optical transmission apparatus further includes the first transmitting module, and the first transmitting module is connected to the first circulator.

In a possible design, the first optical transmission apparatus is an optical transmission apparatus on an active antenna unit AAU side, and the second optical transmission apparatus is an optical transmission apparatus on a baseband unit BBU side. Alternatively, the first optical transmission apparatus is an optical transmission apparatus on a BBU side, and the second optical transmission apparatus is an optical transmission apparatus on an AAU side.

According to a fourth aspect, embodiments of this application provide an optical transmission method, and the method is applied to a second optical transmission apparatus. The apparatus includes a second coupler, a second transmitting module, and a second circulator. The method includes: The second coupler separates a third unmodulated optical signal into at least a first unmodulated optical signal and a second unmodulated optical signal. The third unmodulated optical signal is an optical signal provided by a first optical transmission apparatus. The second transmitting module sends a second modulated optical signal to the first optical transmission apparatus. The second modulated optical signal is obtained by modulating the first unmodulated optical signal. The second circulator receives the second unmodulated optical signal from the second coupler, and sends the second unmodulated optical signal to the first optical transmission apparatus. The second unmodulated optical signal is used for coherence detection of the second modulated optical signal.

In a possible design, that the second circulator sends the second unmodulated optical signal to the first optical transmission apparatus includes: The second circulator sends the second unmodulated optical signal to the first circulator. The second circulator is further connected to the first circulator, and the first optical transmission apparatus includes the first circulator.

In a possible design, the optical transmission method in embodiments of this application further includes: The second polarization control module controls polarization of the third unmodulated optical signal. The second optical transmission apparatus further includes the second polarization control module, and the second polarization control module is connected to the second coupler.

In a possible design, that the second coupler separates a third unmodulated optical signal into at least a first unmodulated optical signal and a second unmodulated optical signal includes: The second coupler separates the third unmodulated optical signal on which polarization control is performed into at least the first unmodulated optical signal and the second unmodulated optical signal.

In a possible design, the optical transmission method in embodiments of this application further includes: The second coupler separates the third unmodulated optical signal on which polarization control is performed into a fifth unmodulated optical signal. The fifth unmodulated optical signal is used for coherence detection of a first modulated optical signal, and the first modulated optical signal is an optical signal transmitted by the first optical transmission apparatus to the second optical transmission apparatus.

In a possible design, the optical transmission method in embodiments of this application further includes: A second receiving module receives the first modulated optical signal from the first optical transmission apparatus through the second circulator, and receives the fifth unmodulated optical signal from the second coupler. The apparatus further includes the second receiving module, and the second receiving module is connected to both the second circulator and the second coupler.

In a possible design, the optical transmission method in embodiments of this application further includes: The second polarization control module controls polarization of the second modulated optical signal. The second polarization control module is further connected to the second transmitting module.

In a possible design, the first optical transmission apparatus is an optical transmission apparatus on an active antenna unit AAU side, and the second optical transmission apparatus is an optical transmission apparatus on a baseband unit BBU side. Alternatively, the first optical transmission apparatus is an optical transmission apparatus on a BBU side, and the second optical transmission apparatus is an optical transmission apparatus on an AAU side.

According to a fifth aspect, embodiments of this application provide a computer-readable storage medium, where the computer-readable storage medium stores a program. When the program is invoked by a processor, the method according to any one of the third aspect or the implementations of the third aspect is performed, or the method according to any one of the fourth aspect or the implementations of the fourth aspect is performed.

According to a sixth aspect, embodiments of this application provide a computer program product including instructions. When the computer program product is invoked by a processor, the method in any one of the third aspect or the implementations of the third aspect is performed, or the method in any one of the fourth aspect or the implementations of the fourth aspect is performed.

According to a seventh aspect, embodiments of this application provide a communication system. The system includes the first optical transmission apparatus according to the first aspect or any one of the first aspect or the implementations of the first aspect, and the second optical transmission apparatus according to the second aspect or any one of the second aspect or the implementations of the second aspect.

For technical effects brought by any design of the second aspect to the seventh aspect, refer to beneficial effects in the corresponding method provided above. Details are not described herein again.

DESCRIPTION OF EMBODIMENTS

Figure 1:
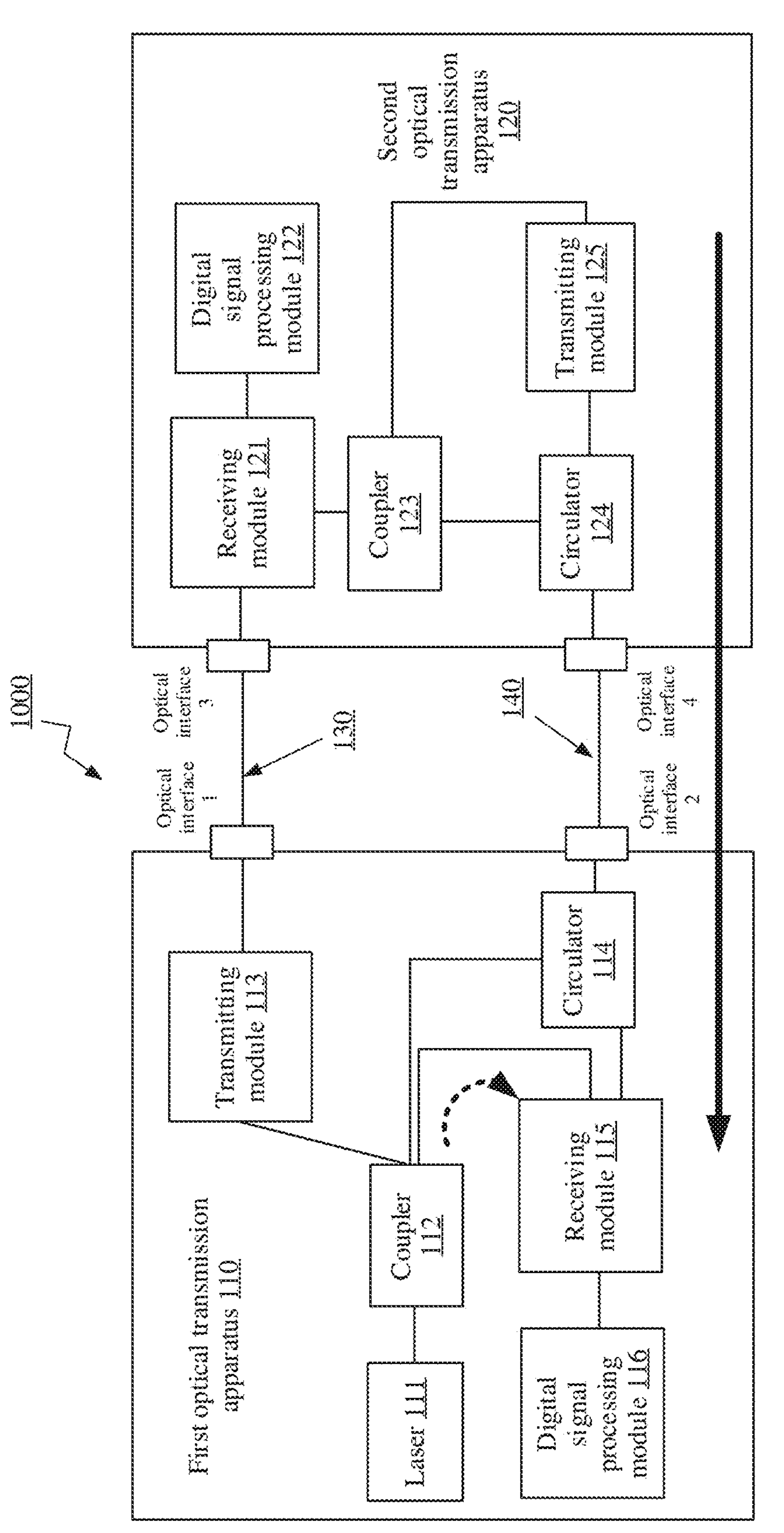
FIG. 1 is a diagram of an architecture of a communication system according to an embodiment of this application.

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In embodiments of this application, "a plurality of" includes two or more. In embodiments of this application, the word "example" or "for example" or the like is used to represent giving an example, an illustration, or a description. Any embodiment or design scheme described as an "example" or "for example" in embodiments of this application should not be explained as being more preferred or having more advantages than another embodiment or design scheme. To be precise, the word "example", "for example", or the like is intended to present a related concept in a specific manner. In embodiments of this application, "transmission" includes "sending" or "receiving".

First, for ease of understanding embodiments of this application, the following briefly describes related technologies in this application.

1. Optical Modulation, Unmodulated Optical Signal, and Modulated Optical Signal

Optical modulation generally refers to a process in which an optical carrier carries information by changing a parameter of the optical carrier. For example, the parameter of the optical carrier includes amplitude, intensity, a phase, a frequency, or the like.

In embodiments of this application, an optical carrier on which no optical modulation is performed is described as an unmodulated optical signal, for example, laser light emitted by a laser or light provided by another light source. This is not limited in embodiments of this application.

In embodiments of this application, an optical signal obtained through optical modulation is described as a modulated optical signal, for example, an optical signal obtained through amplitude modulation, intensity modulation, phase modulation, or frequency modulation.

2. Phase Noise

Phase noise generally causes a random phase offset of a signal in time domain, and this phase offset may also be observed in frequency domain.

3. Coherent Optical Transmission Technology

The coherent optical transmission technology mainly uses a single-frequency coherent light source and carries more modulation information by using parameters in a plurality of dimensions of light, such as a phase, a frequency, and amplitude, to fully use an optical fiber bandwidth and implement ultra-high capacity transmission.

For example, the following describes a system that performs communication by using the coherent optical transmission technology. FIG. 1 is a diagram of an architecture of a conventional communication system 1000 according to an embodiment of this application. As shown in FIG. 1, the communication system 1000 includes a first optical transmission apparatus 110 and a second optical transmission apparatus 120.

The first optical transmission apparatus 110 includes a laser 111, a coupler 112, a transmitting module 113, a circulator 114, a receiving module 115, and a digital signal processing (DSP) module 116. In the first optical transmission apparatus 110, the laser 111 is connected to the coupler 112, and the coupler 112 is further connected to the transmitting module 113, a port of the circulator 114, and the receiving module 115. The transmitting module 113 is further connected to an optical interface 1. Another port of the circulator 114 is connected to an optical interface 2. Still another port of the circulator 114 is connected to the receiving module 115. The receiving module 115 is further connected to the DSP module 116.

The second optical transmission apparatus 120 includes a receiving module 121, a DSP module 122, a coupler 123, a circulator 124, and a transmitting module 125. In the second optical transmission apparatus 120, the receiving module 121 is connected to an optical interface 3, and the receiving module 121 is further connected to both the DSP module 122 and the coupler 123. The coupler 123 is further connected to a port of the circulator 124 and the transmitting module 125, another port of the circulator 124 is connected to the transmitting module 125, and still another port of the circulator 124 is connected to an optical interface 4.

The optical interface 1 and the optical interface 3 are connected through a single-mode optical fiber 130, and the optical interface 2 and the optical interface 4 are connected through a single-mode optical fiber 140.

For example, a processing process of each element in the first optical transmission apparatus 110 is as follows:

The laser 111 transmits an unmodulated optical signal 1. After receiving the unmodulated optical signal 1 from the laser 111, the coupler 112 separates the received unmodulated optical signal 1 into one of the following items:

- item 1: an unmodulated optical signal 2, an unmodulated optical signal 3, and an unmodulated optical signal 4;
- item 2: an unmodulated optical signal 2 and an unmodulated optical signal 3; or
- item 3: an unmodulated optical signal 3 and an unmodulated optical signal 4.

When the unmodulated optical signal 2 is obtained through separation, the coupler 112 sends the unmodulated optical signal 2 to the transmitting module 113 as local oscillator light of the transmitting module 113. The transmitting module 113 modulates the unmodulated optical signal 2 by using the information 1 to obtain a first modulated optical signal, and sends the first modulated optical signal to the second optical transmission apparatus 120 through the optical interface 1 and the single-mode optical fiber 130.

When the unmodulated optical signal 3 is obtained through separation, the coupler 112 sends the unmodulated optical signal 3 to a port of the circulator 114. The circulator 114 sends the unmodulated optical signal 3 to the optical interface 2 through another port, to send the unmodulated optical signal 3 to the second optical transmission apparatus 120 through the single-mode optical fiber 140.

When the unmodulated optical signal 4 is obtained through separation, the coupler 112 sends the unmodulated optical signal 4 to the receiving module 115 as local oscillator light of the receiving module 115, as shown by a dashed line arrow in FIG. 1. The circulator 114 further receives a second modulated optical signal from the optical interface 2, and sends the second modulated optical signal to the receiving module 115, as shown by a solid line arrow in FIG. 1. The receiving module 115 performs coherence detection on the second modulated optical signal by using the unmodulated optical signal 4, to obtain an electrical signal 2, and sends the electrical signal 2 to the DSP module 116. The DSP module 116 performs sampling, analog-to-digital conversion, and digital signal processing on the electrical signal 2, to obtain information 2.

A processing process of each element in the second optical transmission apparatus 120 is as follows:

When the first optical transmission apparatus 110 sends the unmodulated optical signal 3 to the second optical transmission apparatus 120 through the single-mode optical fiber 140, the circulator 124 receives the unmodulated optical signal 3 through the optical interface 4, and sends the unmodulated optical signal 3 to the coupler 123. The coupler 123 separates the unmodulated optical signal 3 into one of the following items:

- item 1: an unmodulated optical signal 5 and an unmodulated optical signal 6;
- item 2: an unmodulated optical signal 5. In other words, an unmodulated optical signal 3 is used as the unmodulated optical signal 5; or
- item 3: unmodulated optical signal 6. In other words, an unmodulated optical signal 3 is used as the unmodulated optical signal 6.

When the unmodulated optical signal 5 is obtained through separation, the coupler 123 sends the unmodulated optical signal 5 to the receiving module 121 as local oscillator light of the receiving module 121. When the first optical transmission apparatus 110 sends the first modulated optical signal to the second optical transmission apparatus 120 through the single-mode optical fiber 130, the receiving module 121 receives the first modulated optical signal through the optical interface 3. The receiving module 115 performs coherence detection on the first modulated optical signal by using the unmodulated optical signal 5, to obtain the electrical signal 1, and sends the electrical signal 1 to the DSP module 116. The DSP module 116 performs sampling, analog-to-digital conversion, and digital signal processing on the electrical signal 1, to obtain the information 1.

When the unmodulated optical signal 6 is obtained through separation, the coupler 123 sends the unmodulated optical signal 6 to the transmitting module 125 as local oscillator light of the transmitting module 125. The transmitting module 125 modulates the unmodulated optical signal 6 by using the information 2, to obtain the second modulated optical signal, and sends the second modulated optical signal to the circulator 124. The circulator 124 sends the second modulated optical signal to the first optical transmission apparatus 110 through the optical interface 4 and the single-mode optical fiber 140, as shown by a solid line arrow in FIG. 1.

It should be understood that FIG. 1 is merely used as a possible implementation to describe an example of an architecture and an operating process of a conventional communication system, and should not be construed as a limitation on embodiments of this application.

In conclusion, it can be learned that, when the second optical transmission apparatus 120 sends the second modulated optical signal to the first optical transmission apparatus 110 through the single-mode optical fiber 140, for the second modulated optical signal, an optical signal used for coherence detection is the unmodulated optical signal 4. However, when a distance between the first optical transmission apparatus 110 and the second optical transmission apparatus 120 is long, a difference between transmission path lengths of the unmodulated optical signal 4 and the second modulated optical signal is large, and the unmodulated optical signal 4 and the second modulated optical signal are not related to each other. This causes large phase noise.

Figure 2A:
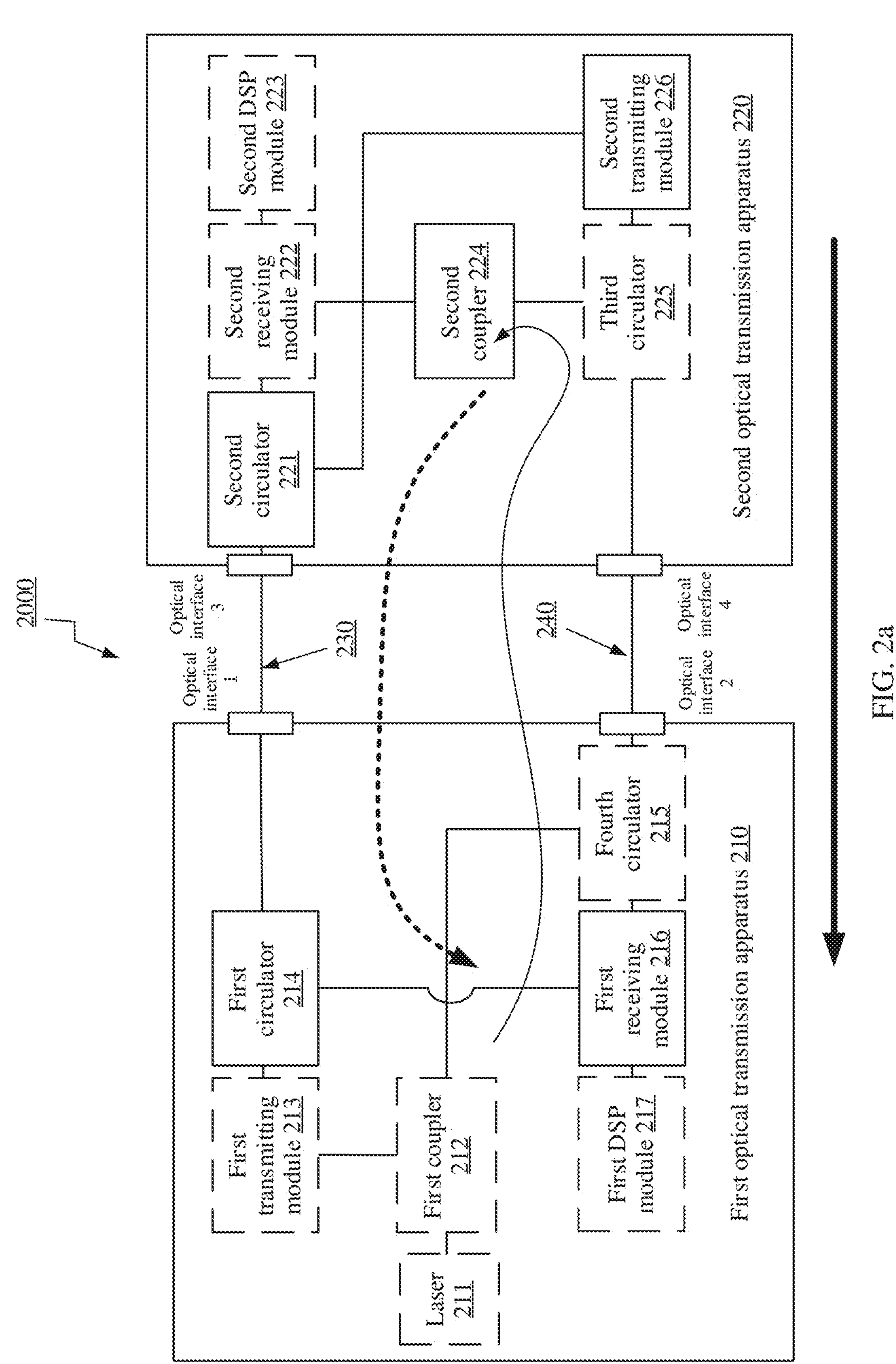
FIG. 2*a* is a diagram of an architecture of another communication system according to an embodiment of this application.

In view of this, embodiments of this application provide a communication system. As shown in FIG. 2*a*, a communication system 2000 provided in embodiments of this application includes a first optical transmission apparatus 210 and a second optical transmission apparatus 220. For example, the first optical transmission apparatus 210 and the second optical transmission apparatus 220 are connected through an optical fiber. For example, an optical interface 1 of the first optical transmission apparatus 210 is connected to an optical interface 3 of the second optical transmission apparatus 220 through a single-mode optical fiber 230, and an optical interface 2 of the first optical transmission apparatus 210 is connected to an optical interface 4 of the second optical transmission apparatus 220 through a single-mode optical fiber 240.

For example, the first optical transmission apparatus 210 may be implemented as an optical transmission apparatus on a baseband unit (BBU) side, for example, an optical module pluggable on a BBU. The second optical transmission apparatus 220 may be implemented as an optical transmission apparatus on an active antenna unit (AAU) side, for example, an optical module pluggable on an AAU. Alternatively, on the contrary, the first optical transmission apparatus 210 may be implemented as an optical transmission apparatus on an AAU side, for example, an optical module pluggable on an AAU. The second optical transmission apparatus 220 may be implemented as an optical transmission apparatus on a BBU side, for example, an optical module pluggable on a BBU. It should be understood that, with evolution of technologies, the AAU and the BBU may have other names, or may be other devices that can implement functions of the AAU and the BBU. Names of the AAU and the BBU are not limited in embodiments of this application. Similarly, the first optical transmission apparatus 210 and the second optical transmission apparatus 220 may have other names, or may be implemented as optical transmission apparatuses on another device side. This is not limited in embodiments of this application.

There may be two signal transmission directions between the first optical transmission apparatus 210 and the second optical transmission apparatus 220. To be specific, transmission from the first optical transmission apparatus 210 to the second optical transmission apparatus 220 may be referred to as a first transmission direction, and transmission from the second optical transmission apparatus 220 to the first optical transmission apparatus 210 may be referred to as a second transmission direction. For example, when the AAU and the BBU are implemented, a process in which the BBU sends a modulated optical signal to the AAU may also be referred to as downlink transmission. A process in which the AAU sends a modulated optical signal to the BBU may also be referred to as uplink transmission. In embodiments of this application, for a modulated optical signal, a modulated optical signal transmitted in the first transmission direction is described as a first modulated optical signal. A modulated optical signal transmitted in the second transmission direction is described as a second modulated optical signal.

As shown in FIG. 2*a*, in the first optical transmission apparatus 210, the first optical transmission apparatus 210 includes a first circulator 214 and a first receiving module 216, as shown by solid line blocks in FIG. 2*a*. The first circulator 214 is connected to the first receiving module 216. For example, a port of the first circulator 214 is connected to the first receiving module 216 through a polarization maintaining optical fiber or an optical waveguide.

The first circulator 214 can implement unidirectional signal transmission. For example, the first circulator 214 may be a three-port component. For example, three ports of the first circulator 214 are respectively denoted as a port A, a port B, and a port C. For the first circulator 214, a signal received by the port A is sent through the port B, a signal received by the port B is sent through the port C, and a signal received by the port C is sent through the port A, to implement unidirectional signal transmission. It should be understood that, in embodiments of this application, the three-port component is merely an example for describing the first circulator 214. Certainly, the first circulator 214 may also have another quantity of ports, provided that unidirectional signal transmission can be implemented. Specific implementation of the first circulator 214 is not limited in embodiments of this application.

In embodiments of this application, the first circulator 214 is configured to receive an unmodulated optical signal 7 from the second optical transmission apparatus 220. For example, using FIG. 2*a* as an example, the first circulator 214 is configured to receive the unmodulated optical signal 7 from the second optical transmission apparatus 220 through the optical interface 1 and the single-mode optical fiber 230.

Optionally, when the second optical transmission apparatus 220 includes a second circulator 221, using FIG. 2*a* as an example, the first circulator 214 is connected to the second circulator 221. For example, the first circulator 214 is connected to the second circulator 221 through the optical interface 1, the single-mode optical fiber 230, and the optical interface 3. The first circulator 214 is configured to receive the unmodulated optical signal 7 from the second circulator 221 through the optical interface 1, the single-mode optical fiber 230, and the optical interface 3, as shown by a dashed line arrow in FIG. 2*a*. For the second circulator 221, refer to the description of the second optical transmission apparatus 220. Details are not described herein again.

The first receiving module 216 can convert an optical signal into an electrical signal. The first receiving module 216 may also be referred to as a receiver, or a coherent receiver. In embodiments of this application, only the receiving module is used as an example for description. For example, the first receiving module 216 may be implemented as an integrated coherent receiver (ICR). Coherence means that the first receiving module 216 can restore amplitude information and phase information.

In embodiments of this application, the first receiving module 216 is configured to receive the second modulated optical signal from the second optical transmission apparatus 220. For example, using FIG. 2*a* as an example, the first receiving module 216 is configured to receive the second modulated optical signal from the second optical transmission apparatus 220 through the optical interface 2 and the single-mode optical fiber 240.

Optionally, when the first optical transmission apparatus 210 includes a fourth circulator 215, and the second optical transmission apparatus 220 includes a third circulator 225, as shown in FIG. 2*a*, the first receiving module 216 is connected to the fourth circulator 215, and the fourth circulator 215 is connected to the third circulator 225 through the optical interface 2, the single-mode optical fiber 240, and the optical interface 4. The first receiving module 216 is configured to receive the second modulated optical signal from the third circulator 225 through the fourth circulator 215, the optical interface 2, and the single-mode optical fiber 240, as shown by a bold solid line arrow in FIG. 2*a*. The first receiving module 216 is further configured to receive the unmodulated optical signal 7 from the first circulator 214. The unmodulated optical signal 7 is used to perform coherence detection on the second modulated optical signal to obtain the electrical signal 2.

The second modulated optical signal is obtained by modulating the unmodulated optical signal 6. For details, refer to the description of the second transmitting module 226. The unmodulated optical signal 6 and the unmodulated optical signal 7 are obtained by separating the unmodulated optical signal 3. For details, refer to the description of the second coupler 224.

The unmodulated optical signal 3 is an optical signal provided by the first optical transmission apparatus 210 to the second optical transmission apparatus 220, as shown by a thin solid line arrow in FIG. 2*a*.

Optionally, FIG. 2*a* is still used as an example. The first optical transmission apparatus 210 includes a laser 211, a first coupler 212, and the fourth circulator 215, as shown by dashed line blocks in FIG. 2*a*. The first coupler 212 is connected to both the laser 211 and the fourth circulator 215. For example, the first coupler 212 is connected to the laser 211 through a polarization maintaining optical fiber or an optical waveguide, and the first coupler 212 is connected to the fourth circulator 215 through a polarization maintaining optical fiber or an optical waveguide.

For example, the laser 211 can provide a continuous wave whose wavelength is λ. The wavelength λ may be in a o band from about 1260 nanometers (nm) to about 1360 nm, or in a C/L band from about 1530 nm to about 1625 nm. The laser 211 may be a distributed feedback (DFB) laser without temperature control or other wavelength control. In this case, the laser 211 may be referred to as an uncooled laser and may have a linewidth greater than 100 kilohertz (kHz) to up to 1 megahertz (MHz) or higher. Alternatively, the laser 211 is a narrow linewidth external cavity laser (ECL).

In embodiments of this application, the laser 211 is configured to transmit the unmodulated optical signal 1. The unmodulated optical signal 1 is used for modulation or coherence detection of an optical signal. It should be understood that, in embodiments of this application, an example in which the laser provides the unmodulated optical signal 1 is merely used for description. Certainly, another device may alternatively provide a light source. This is not limited in embodiments of this application.

For example, the first coupler 212 can separate an input optical signal, to obtain at least one optical signal. For example, the first coupler 212 evenly separates an input optical signal into two beams of optical signals. It should be understood that a quantity of separate light beams and a separate ratio are not limited in embodiments of this application. The coupler may also be referred to as an optical splitter, a splitter, or the like. In embodiments of this application, only a coupler is used as an example for description.

In embodiments of this application, the first coupler 212 is configured to receive the unmodulated optical signal 1 from the laser 211, and separate the unmodulated optical signal 1. A separation result includes one of the following items.

A first item is an unmodulated optical signal 2 and an unmodulated optical signal 3. The first coupler 212 is configured to separate the unmodulated optical signal 1 into the unmodulated optical signal 2 and the unmodulated optical signal 3 based on a specific proportion. The proportion used when the first coupler 212 performs separation may be a preset value, or may be a value determined based on a reference factor. For example, the reference factor includes a transmission distance between the first optical transmission apparatus 210 and the second optical transmission apparatus 220.

A second item is an unmodulated optical signal 3. That is, the unmodulated optical signal 1 is not separated, and is directly used as the unmodulated optical signal 3.

For the foregoing separation result, when the unmodulated optical signal 2 is obtained through separation, the unmodulated optical signal 2 is used to modulate the first modulated optical signal, to implement transmission of the modulated optical signal in the first transmission direction. For details, refer to FIG. 1 or the description of the first transmitting module 213. Details are not described herein again.

For the foregoing separation result, when the unmodulated optical signal 3 is obtained through separation, the unmodulated optical signal 3 is used for modulation and coherence detection of the second modulated optical signal. For details, refer to descriptions of the second transmitting module 226 and the first receiving module 216.

It should be noted that, compared with the coupler 112 in FIG. 1, the first coupler 212 in FIG. 2*a* does not directly provide local oscillator light to the first receiving module 216, that is, the unmodulated optical signal 4.

For example, the fourth circulator 215 can implement unidirectional signal transmission. For example, the fourth circulator 215 may also be a three-port component. For details, refer to the description of the first circulator 214. Details are not described herein again.

In embodiments of this application, the fourth circulator 215 is configured to receive the unmodulated optical signal 3 from the first coupler 212, and send the unmodulated optical signal 3 to the second optical transmission apparatus 220. For example, still using FIG. 2*a* as an example, a port of the fourth circulator 215 is configured to receive the unmodulated optical signal 3 from the first coupler 212. Another port of the fourth circulator 215 is configured to send the unmodulated optical signal 3 to the third circulator 225 through the optical interface 2, the single-mode optical fiber 240, and the optical interface 4.

It can be learned that, when the first optical transmission apparatus 210 includes the laser 211, the first coupler 212, and the fourth circulator 215, the unmodulated optical signal 3 can be separated and transmitted under a joint action of the three components, so that the first optical transmission apparatus 210 provides the unmodulated optical signal 3 to the second optical transmission apparatus 220.

It should be understood that, in FIG. 2*a*, generation and transmission of the unmodulated optical signal 3 are described by using only a connection relationship between the laser 211, the first coupler 212, and the fourth circulator 215 as an example. Certainly, the first optical transmission apparatus may also have another component or a connection relationship between components, to implement generation and transmission functions of the unmodulated optical signal 3. This is not limited in embodiments of this application.

Optionally, the first optical transmission apparatus 210 further includes a first DSP module 217, as shown by a dashed line block in FIG. 2*a*. The first DSP module 217 is connected to the first receiving module 216. For example, the first DSP module 217 is connected to the first receiving module 216 through an electrical connection cable. The first DSP module 217 is configured to receive the electrical signal 2 from the first receiving module 216, and determine the information 2 based on the electrical signal 2. For details, refer to the description in FIG. 1. Details are not described herein again.

It should be noted that, compared with the receiving module 115 in FIG. 1, the local oscillator light of the first receiving module 216 in FIG. 2*a* is provided by the first circulator 214, that is, the unmodulated optical signal 7. The unmodulated optical signal 7 is obtained after the unmodulated optical signal 3 is separate by the second coupler 224, and the unmodulated optical signal 3 is an optical signal separate by the first coupler 212. That is, the local oscillator light of the first receiving module 216 is not an optical signal directly separated by the first coupler 212, but an optical signal that is separated by the first coupler 212 and fed back to the first optical transmission apparatus 210 after passing through the second optical transmission apparatus 220.

It should be understood that, in the first optical transmission apparatus 210, only the first DSP module 217 is used as an example to describe a component that can process the electrical signal 2. Certainly, the first optical transmission apparatus 210 may also have another component or a connection relationship between components, to implement a processing function of the electrical signal 2. This is not limited in embodiments of this application.

For the first optical transmission apparatus 210, both the second modulated optical signal and the unmodulated optical signal 7 come from the second optical transmission apparatus 220. Therefore, transmission paths of the second modulated optical signal and the unmodulated optical signal 7 are the same or close. The second modulated optical signal is obtained by modulating the unmodulated optical signal 6, and the unmodulated optical signal 6 and the unmodulated optical signal 7 are obtained by separating a same optical signal provided by the first optical transmission apparatus 210, that is, the unmodulated optical signal 3. In addition, the transmission paths of the second modulated optical signal and the unmodulated optical signal 7 are the same or close. Therefore, the two signals do not have a frequency difference, and belong to coherent light. This reduces or even eliminates phase noise.

As shown in FIG. 2*a*, in the second optical transmission apparatus 220, the second optical transmission apparatus 220 includes the second coupler 224, the second circulator 221, and the second transmitting module 226. The second coupler 224 is connected to both the second circulator 221 and the second transmitting module 226. For example, an output port of the second coupler 224 is connected to a port of the second circulator 221 through a polarization maintaining optical fiber or an optical waveguide. Another output port of the second coupler 224 is connected to the second transmitting module 226 through a polarization maintaining optical fiber or an optical waveguide.

The second coupler 224 can also separate an input optical signal. For example, for a specific implementation of the second coupler 224, refer to the description of the first coupler 212. Details are not described herein again.

In embodiments of this application, the second coupler 224 is configured to separate the unmodulated optical signal 3. For a proportion used when the second coupler 224 performs separation, refer to the description of the first coupler 212, and details are not described herein again. It should be understood that the proportion used when the second coupler 224 performs separation may be the same as or different from the proportion used when the first coupler 212 performs separation. This is not limited in embodiments of this application.

Optionally, the second optical transmission apparatus 220 further includes the third circulator 225, as shown by a dashed line block in FIG. 2*a*. The third circulator 225 can also implement unidirectional signal transmission. For example, the third circulator 225 may also be a three-port component. For specific implementation, refer to the description of the first circulator 214. Details are not described herein again. For example, a connection relationship between the third circulator 225 and the second coupler 224 is as follows: An input port of the second coupler 224 is connected to a port of the third circulator 225 through a polarization maintaining optical fiber or an optical waveguide, and another port of the third circulator 225 is connected to the optical interface 4 through a polarization maintaining optical fiber or an optical waveguide. In embodiments of this application, the third circulator 225 is configured to: receive the unmodulated optical signal 3 from the fourth circulator 215 through the optical interface 4, the single-mode optical fiber 240, and the optical interface 2, and send the unmodulated optical signal 3 to the second coupler 224, so that the second coupler 224 receives the unmodulated optical signal 3.

For example, a separation result of the second coupler 224 includes one of the following items.

A first item is an unmodulated optical signal 5, an unmodulated optical signal 6, and an unmodulated optical signal 7.

A second item is an unmodulated optical signal 5. That is, the unmodulated optical signal 3 is not separated, and is directly used as the unmodulated optical signal 5;

A third item is an unmodulated optical signal 6 and an unmodulated optical signal 7.

When the unmodulated optical signal 5 is obtained through separation, the unmodulated optical signal 5 is used for coherence detection of the first modulated optical signal. For details, refer to the description of FIG. 1 or a second receiving module 222. Details are not described herein again.

When the unmodulated optical signal 6 is obtained through separation, the second coupler 224 is configured to send the unmodulated optical signal 6 to the second transmitting module 226. The unmodulated optical signal 6 is used to modulate the second modulated optical signal. For details, refer to the description of the second transmitting module 226. Details are not described herein again.

When the unmodulated optical signal 7 is obtained through separation, the second coupler 224 is configured to send the unmodulated optical signal 7 to the second circulator 221. The unmodulated optical signal 7 is provided to the first optical transmission apparatus 210, to implement coherence detection of the second modulated optical signal. For details, refer to the description of the first receiving module 216. Details are not described herein again. For example, FIG. 2*a* is used as an example. The second circulator 221 is configured to send the unmodulated optical signal 7 to the first circulator 214 through the optical interface 3, the single-mode optical fiber 230, and the optical interface 1, as shown by a dashed line arrow in FIG. 2*a*.

It should be noted that, compared with the coupler 123 in FIG. 1, the second coupler 224 in FIG. 2*a* can further separate the unmodulated optical signal 7. For details, refer to the description of the separation result of the second coupler 224.

The second transmitting module 226 can convert an electrical signal into an optical signal. The second transmitting module 226 may also be referred to as a transmitter or a modulator. In embodiments of this application, only the transmitting module is used as an example for description. For example, the second transmitting module 226 may be implemented as a polarization multiplexing in-phase and quadrature (in-phase and quadrature, IQ) modulator. For example, the second transmitting module 226 modulates an unmodulated optical signal by using amplitude information and phase information, for example, by using high-order quadrature amplitude modulation (QAM), to generate a modulated optical signal of a specific wavelength based on an electrical signal. It should be understood that the second transmitting module 226 may alternatively perform modulation by using any other proper modulation format. This is not limited in embodiments of this application.

In embodiments of this application, the second transmitting module 226 is configured to send the second modulated optical signal to the first optical transmission apparatus 210. The second modulated optical signal is obtained after the unmodulated optical signal 6 is modulated. Still using FIG. 2*a* as an example, the second transmitting module 226 is configured to send the second modulated optical signal to the first optical transmission apparatus 210 through the optical interface 4.

Optionally, when the second optical transmission apparatus 220 includes the third circulator 225, still using FIG. 2*a* as an example, an output port of the second transmitting module 226 is connected to a port of the third circulator 225 through a polarization maintaining optical fiber or an optical waveguide. The second transmitting module 226 is configured to send the second modulated optical signal to the third circulator 225. The third circulator 225 is configured to send the second modulated optical signal to the optical interface 4, so that the second modulated optical signal is transmitted to the first optical transmission apparatus 210 through the single-mode optical fiber 240, as shown by a thick solid line arrow in FIG. 2*a*.

The second circulator 221 can implement unidirectional signal transmission. For example, the second circulator 221 may also be a three-port component. For specific implementation, refer to the description of the first circulator 214. Details are not described herein again.

In embodiments of this application, the second circulator 221 is configured to: receive the unmodulated optical signal 7 from the second coupler 224, and send the unmodulated optical signal 7 to the first optical transmission apparatus 210. For example, as shown in FIG. 2*a*, the second circulator 221 is configured to send the unmodulated optical signal 7 to the first optical transmission apparatus 210 through the optical interface 3.

Optionally, when the first optical transmission apparatus 210 includes the first circulator 214, the second circulator 221 is connected to the first circulator 214. The second circulator 221 is configured to send the unmodulated optical signal 7 to the first circulator 214. For example, the second circulator 221 is configured to send the unmodulated optical signal 7 to the first circulator 214 through the optical interface 3, the single-mode optical fiber 230, and the optical interface 1, as shown by a dashed line arrow in FIG. 2*a*. The unmodulated optical signal 7 is used for coherence detection of the second modulated optical signal. For details, refer to the description of the first receiving module 216. Details are not described herein again.

For the second optical transmission apparatus 220, the second modulated optical signal and the unmodulated optical signal 7 are transmitted to the first optical transmission apparatus 210. Therefore, transmission paths of the second modulated optical signal and the unmodulated optical signal 7 are the same or close. The second modulated optical signal is obtained by modulating the unmodulated optical signal 6, and the unmodulated optical signal 6 and the unmodulated optical signal 7 are obtained by separating a same optical signal provided by the first optical transmission apparatus 210, that is, the unmodulated optical signal 3. In addition, the transmission paths of the second modulated optical signal and the unmodulated optical signal 7 are the same or close. Therefore, the two signals do not have a frequency difference, and belong to coherent light. This reduces or even eliminates phase noise.

The foregoing uses only the second modulated optical signal as an example to describe a connection relationship and a function of each component in terms of modulation, transmission, and demodulation. Optionally, the following uses the first modulated optical signal as an example to describe a connection relationship and a function of each component in terms of modulation, transmission, and coherence detection.

Optionally, the first optical transmission apparatus 210 further includes the first transmitting module 213, as shown by a dashed line block in FIG. 2*a*. The first transmitting module 213 can also convert an electrical signal into an optical signal. For details, refer to the description of the second transmitting module 226. Details are not described herein again. For example, a connection relationship between the first transmitting module 213 and another component is as follows: The first transmitting module 213 is connected to both the first coupler 212 and the first circulator 214. For example, the first transmitting module 213 is connected to the first coupler 212 through a polarization maintaining optical fiber or an optical waveguide, and the first transmitting module 213 is connected to the first circulator 214 through a polarization maintaining optical fiber or an optical waveguide.

In embodiments of this application, a function of the first transmitting module 213 is described as follows:

When the first coupler 212 obtains the unmodulated optical signal 2 through separating, the first transmitting module 213 is configured to receive the unmodulated optical signal 2 from the first coupler 212, and modulate the unmodulated optical signal 2 to obtain the first modulated optical signal. For details, refer to the description in FIG. 1. Details are not described herein again. It should be understood that, in embodiments of this application, only the first transmitting module 213 is used as an example to describe a connection relationship between the first transmitting module 213 and another component, to implement a function of generating the first modulated optical signal. Certainly, the first optical transmission apparatus 210 may alternatively have another component or a connection relationship between components, to implement a function of generating the first modulated optical signal. This is not limited in embodiments of this application.

Figure 2B:
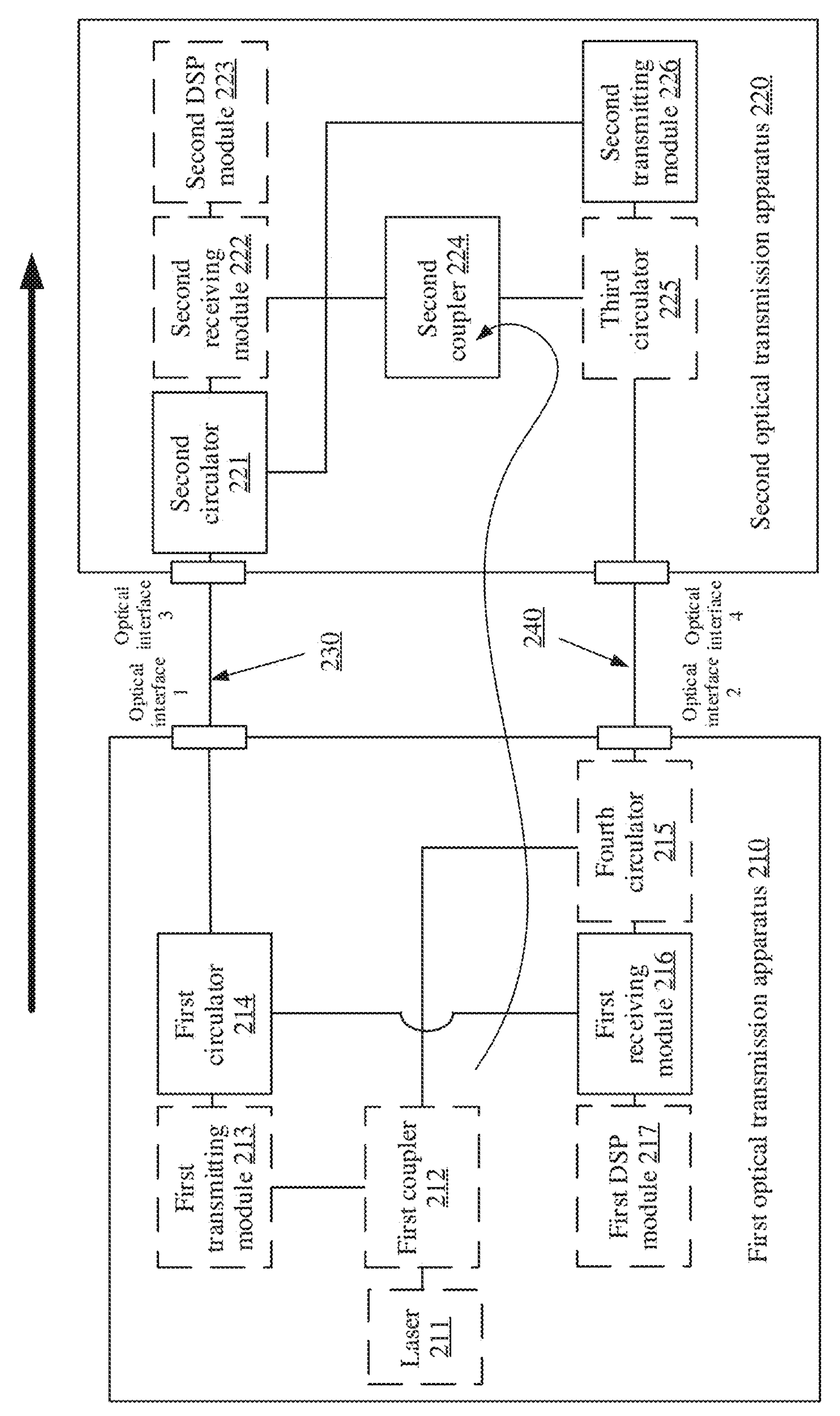
FIG. 2*b* is a diagram of an architecture of still another communication system according to an embodiment of this application.

In addition, in embodiments of this application, the first circulator 214 is further configured to: receive the first modulated optical signal from the first transmitting module 213, and send the first modulated optical signal to the second optical transmission apparatus 220. For example, the first circulator 214 is configured to send the first modulated optical signal to the second circulator 221 through the optical interface 1, the single-mode optical fiber 230, and the optical interface 3, as shown by a thick solid line arrow in FIG. 2*b*.

Optionally, in the second optical transmission apparatus 220, the second circulator 221 is further configured to: receive the first modulated optical signal from the first optical transmission apparatus 210, and send the first modulated optical signal to the second receiving module 222. For example, the second circulator 221 is configured to receive the first modulated optical signal from the first circulator 214 through the optical interface 3, and then send the first modulated optical signal to the second receiving module 222.

Optionally, the second optical transmission apparatus 220 further includes a second receiving module 222, as shown by a dashed line block in FIG. 2*a*. The second receiving module 222 can also convert an optical signal into an electrical signal. For example, for specific implementation of the second receiving module 222, refer to the description of the first receiving module 216. Details are not described herein again. For example, a connection relationship between the second receiving module 222 and another component is described as follows: The second receiving module 222 is connected to both the second coupler 224 and the second circulator 221. For example, the second receiving module 222 is connected to the second coupler 224 through a polarization maintaining optical fiber or an optical waveguide, and the second receiving module 222 is connected to the second circulator 221 through a polarization maintaining optical fiber or an optical waveguide.

In embodiments of this application, a function of the second receiving module 222 is described as follows:

The second receiving module 222 is configured to receive the first modulated optical signal from the second circulator 221. When the second coupler 224 obtains the unmodulated optical signal 5 through separating, the unmodulated optical signal 5 is used to perform coherence detection on the first modulated optical signal. For example, the second receiving module 222 is further configured to perform coherence detection on the first modulated optical signal by using the unmodulated optical signal 5, to obtain the electrical signal 1. For details, refer to the description in FIG. 1. Details are not described herein again.

It should be understood that, in embodiments of this application, only the second receiving module 222 is used as an example to describe a connection relationship between the second receiving module 222 and another component, to implement a function of receiving the second modulated optical signal. Certainly, the second optical transmission apparatus 220 may alternatively have another component or a connection relationship between components, to implement a function of receiving the second modulated optical signal. This is not limited in embodiments of this application.

Optionally, the second optical transmission apparatus 220 further includes a second DSP module 223, as shown by a dashed line block in FIG. 2*a*. The second DSP module 223 is connected to the second receiving module 222. For example, the second DSP module 223 is connected to the second receiving module 222 through an electrical connection cable. The second DSP module 223 is configured to receive the electrical signal 1 from the second receiving module 222, and determine the information 1 based on the electrical signal 1. For details, refer to the description in FIG. 1. Details are not described herein again.

It should be understood that, in the second optical transmission apparatus 220, only the second DSP module 223 is used as an example to describe a component that can process the electrical signal 1. Certainly, the second optical transmission apparatus 220 may also have another component or a connection relationship between components, to implement a processing function of the electrical signal 1. This is not limited in embodiments of this application.

It can be learned that modulation, transmission, and coherence detection functions of the first modulated optical signal can be implemented based on the connection relationships and functions of the foregoing components.

Figure 3A:
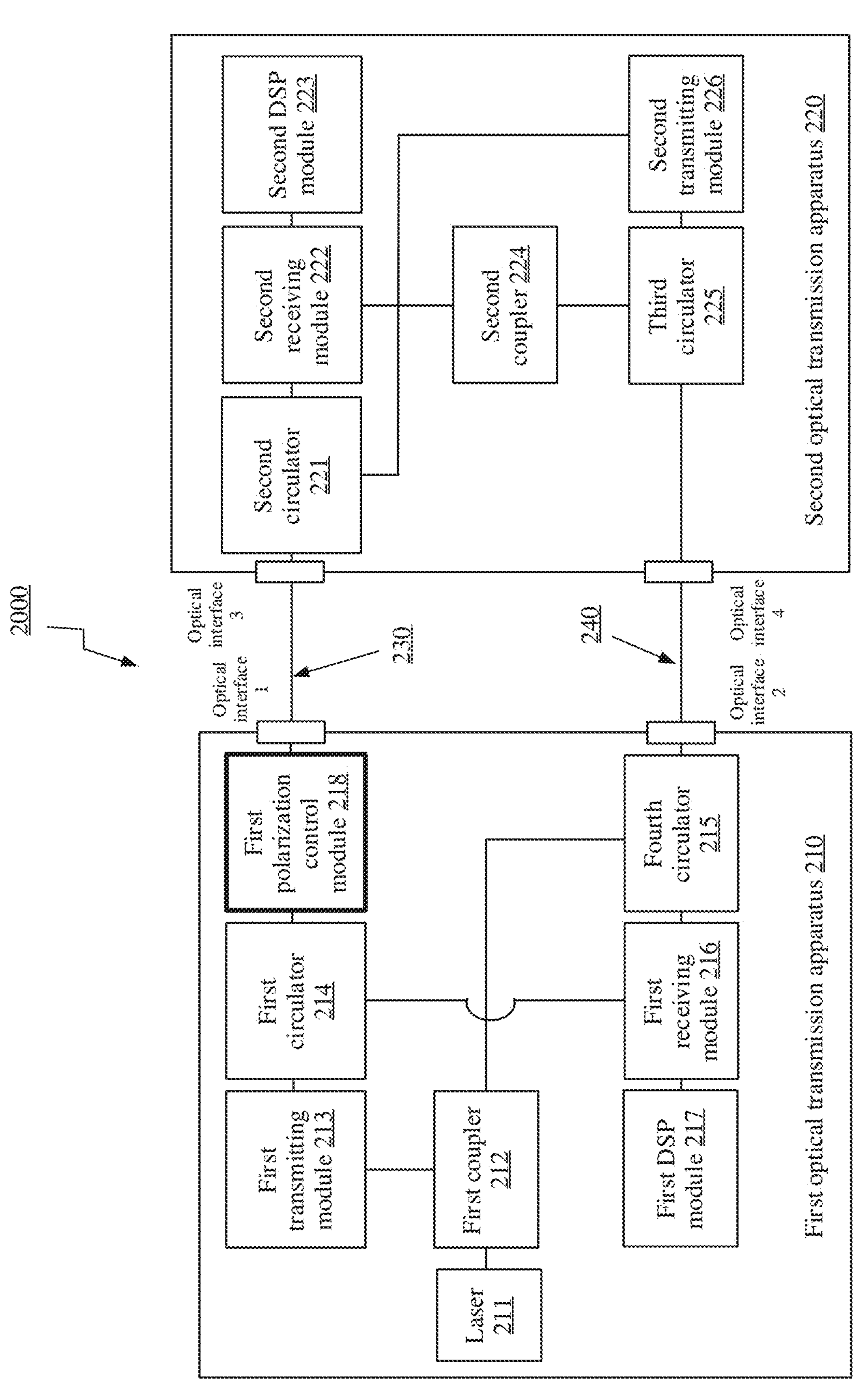
FIG. 3*a* is a diagram of an architecture of yet another communication system according to an embodiment of this application.

In some embodiments, as shown in FIG. 3*a*, the first optical transmission apparatus 210 further includes a first polarization control (APC) module 218, as shown by a thick solid line block in FIG. 3*a*. A polarization control module is a polarization state control component, and can convert any dynamically changing input polarization state into any expected output polarization state. For example, the polarization control module changes a polarization state by using a birefringence phenomenon of a crystal, and obtains polarized light of an expected polarization state by using a specific composition method and control algorithm. The composition method may include a quantity of wave plates connected in series and a relative orientation relationship between the wave plates. The control algorithm may include dynamically changing an azimuth of the wave plate and a birefringent relative position difference at a high speed. The polarization control module may also be referred to as a polarization controller. In embodiments of this application, only the polarization control module is used as an example for description.

For example, a connection relationship between the first polarization control module 218 and another component is described as follows: The first polarization control module 218 is connected to the first circulator 214. For example, with reference to FIG. 3*a*, the first polarization control module 218 is connected to the first circulator 214 through a polarization maintaining optical fiber or an optical waveguide, and the first polarization control module 218 is connected to the optical interface 1 through a polarization maintaining optical fiber or an optical waveguide. In addition, the first polarization control module 218 may also not be disposed on a first optical transmission apparatus 210 side, but may be disposed on a second optical transmission apparatus 220 side. For example, the second circulator 221 is connected to the optical interface 3 through the first polarization control module 218 (not shown in FIG. 3*a*). This is not limited in embodiments of this application.

It should be understood that, the first polarization control module 218 and the first receiving module 216 may be components independent of each other, as shown in FIG. 3*a*. The first polarization control module 218 and the first receiving module 216 may also be integrated. For example, the first polarization control module 218 is an internal component of the first receiving module 216, which is not shown in FIG. 3*a*.

A function of the first polarization control module 218 is described as follows: The first polarization control module 218 is configured to control polarization of the unmodulated optical signal 7. For example, the first polarization control module 218 is configured to convert a polarization state of the unmodulated optical signal 7 into an expected polarization state after receiving the unmodulated optical signal 7 through the optical interface 1. The expected polarization state may be the same as a polarization state of the second modulated optical signal. The first polarization control module 218 is further configured to send the unmodulated optical signal 7 on which polarization control is performed to the first receiving module 216 through the first circulator 214.

It should be understood that the optical interface 1 and the optical interface 3 are generally connected through the polarization maintaining optical fiber, to ensure that the unmodulated optical signal 7 has sufficient energy in a fixed polarization state as much as possible, so that coherence detection is performed normally. However, in an actual application, the polarization maintaining optical fiber may be affected by extrusion or other application environment changes, such as treading and construction stretching. As a result, a function of maintaining a polarization state of the polarization maintaining optical fiber is degraded. In this case, the polarization state of the unmodulated optical signal 7 transmitted in the polarization maintaining optical fiber rotates randomly. This causes a coherence detection failure. However, the first polarization control module 218 can convert the polarization state of the unmodulated optical signal 7 into the expected polarization state, thereby facilitating normal coherence detection.

In this case, that the unmodulated optical signal 7 is used to perform coherence detection on the second modulated optical signal includes: The unmodulated optical signal 7 on which polarization control is performed is used to perform coherence detection on the second modulated optical signal. For example, FIG. 3*a* is still used as an example. When the second optical transmission apparatus 220 sends the unmodulated optical signal 7 to the first optical transmission apparatus 210, the first receiving module 216 is configured to receive the unmodulated optical signal 7 that is from the first circulator 214 and on which polarization control is performed, to serve as local oscillator light to perform coherence detection on the second modulated optical signal.

In this way, the local oscillator light used for coherence detection is the unmodulated optical signal 7 on which polarization control is performed. Because the unmodulated optical signal 7 has high energy in an expected polarization state, impact of a random polarization state change is eliminated or reduced. Therefore, accuracy of coherence detection is improved.

Optionally, the first polarization control module 218 is further configured to control polarization of the first modulated optical signal. The first modulated optical signal is an optical signal transmitted by the first optical transmission apparatus 210 to the second optical transmission apparatus 220. Refer to the description in FIG. 2*b*. Details are not described herein again. For example, still using FIG. 3*a* as an example, the first circulator 214 is further configured to send the first modulated optical signal to the first polarization control module 218. The first polarization control module 218 is configured to control polarization of the first modulated optical signal, so that the first modulated optical signal on which polarization control is performed has more energy in an expected polarization direction. The first modulated optical signal on which polarization control is performed and the unmodulated optical signal 3 on which polarization control is performed may have a same polarization state. When polarization control is also performed on the unmodulated optical signal 3 on a second optical transmission apparatus 220 side, the local oscillator light (that is, the unmodulated optical signal 5) that is used by the second receiving module 222 to perform coherence detection and the first modulated optical signal have a same polarization state. In this way, after the second receiving module 222 performs coherence detection, the electrical signal 1 may be obtained. The second DSP module 223 may obtain the information 1 based on the electrical signal 1, and does not need to perform polarization demultiplexing processing, so that system power consumption is reduced, and no chip needs to be independently designed. This helps reduce system costs.

It should be understood that, when the coherent communication system 2000 includes the first polarization control module 218, the single-mode optical fiber 230 may also be replaced with another connection material, for example, a common fiber, to reduce system costs.

Figure 3B:
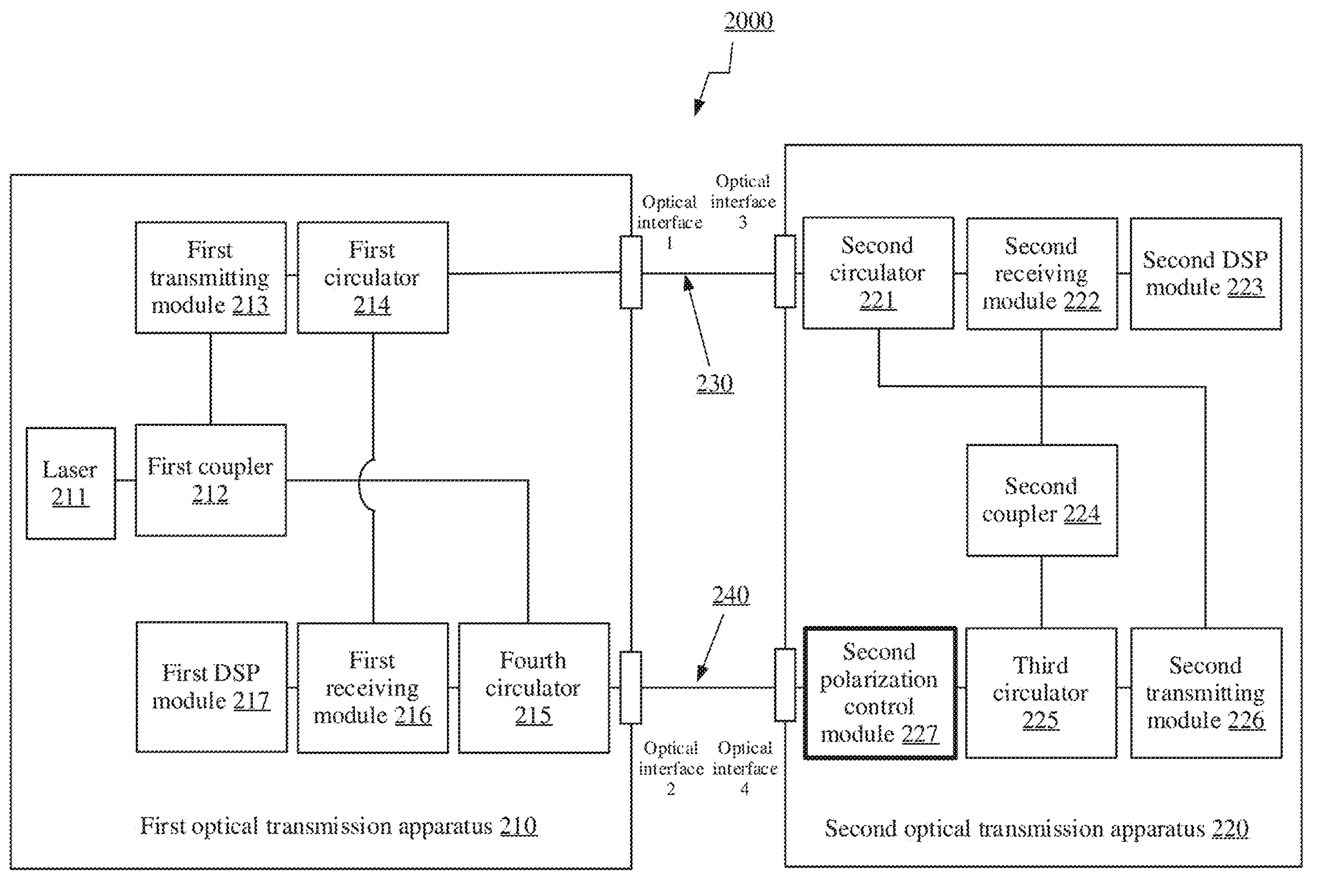
FIG. 3*b* is a diagram of an architecture of still yet another communication system according to an embodiment of this application.

In some embodiments, the second optical transmission apparatus 220 further includes a second polarization control module 227, as shown by a thick solid line block in FIG. 3*b*. For the polarization control module, refer to the description of the first polarization control module 218. Details are not described herein again.

For example, a connection relationship between the second polarization control module 227 and another component is described as follows:

The second polarization control module 227 is connected to the second coupler 224. For example, refer to FIG. 3*b*. The second polarization control module 227 is connected to the second coupler 224 through the third circulator 225. In addition, the second polarization control module 227 may also not be disposed on the second optical transmission apparatus 220 side, but may be disposed on the first optical transmission apparatus 210 side. For example, the fourth circulator 215 is connected to the optical interface 2 through the second polarization control module 227 (not shown in FIG. 3*b*). This is not limited in embodiments of this application.

It should be understood that the second polarization control module 227 and the second receiving module 222 may be components independent of each other, as shown in FIG. 3*b*. The second polarization control module 227 and the second receiving module 222 may also be integrated. For example, the second polarization control module 227 is an internal component of the second receiving module 222, which is not shown in FIG. 3*b*.

A function of the second polarization control module 227 is described as follows:

The second polarization control module 227 is configured to control polarization of the unmodulated optical signal 3. For example, the second polarization control module 227 is configured to receive the unmodulated optical signal 3 through the optical interface 4, and convert a polarization state of the unmodulated optical signal 3 into an expected polarization state. The expected polarization state may be the same as a polarization state of the unmodulated optical signal 3 on the first optical transmission apparatus 210 side, or may be a polarization state in another direction. This is not limited in embodiments of this application.

In this case, the second coupler 224 is configured to separate the unmodulated optical signal 3 on which polarization control is performed. For example, the second coupler 224 is configured to receive, through the third circulator 225, the unmodulated optical signal 3 that is from the second polarization control module 227 and on which polarization control is performed, and then separate the unmodulated optical signal 3. For example, the second coupler 224 is configured to separate the unmodulated optical signal 3 on which polarization control is performed into at least the unmodulated optical signal 6 and the unmodulated optical signal 7. For another example, the second coupler 224 is configured to separate the unmodulated optical signal 3 on which polarization control is performed into at least the unmodulated optical signal 6, the unmodulated optical signal 7, and the unmodulated optical signal 5. For another example, the second coupler 224 is configured to separate the unmodulated optical signal 3 on which polarization control is performed into the unmodulated optical signal 5. For the unmodulated optical signal 6, refer to the description of the second transmitting module 226. For the unmodulated optical signal 7, refer to the description of the second circulator 221. The unmodulated optical signal 5 is used for coherence detection of the first modulated optical signal. For details, refer to the description of the second receiving module 222. Details are not described herein again. Because the unmodulated optical signal 6, the unmodulated optical signal 7, and the unmodulated optical signal 5 are obtained by separating the unmodulated optical signal 3 on which polarization control is performed, the unmodulated optical signal 6, the unmodulated optical signal 7, and the unmodulated optical signal 5 have a same polarization state as the unmodulated optical signal 3 on which polarization control is performed, and are also optical signals that have undergone polarization control.

The second receiving module 222 is configured to receive the first modulated optical signal from the first optical transmission apparatus 210. As shown in FIG. 3*b*, the second receiving module 222 is configured to receive, through the second circulator 221, the first modulated optical signal from the first circulator 214. The first modulated optical signal is obtained by modulating the unmodulated optical signal 2. For details, refer to the description of the first transmitting module 213. The unmodulated optical signal 2 and the unmodulated optical signal 3 are obtained by separating a same optical signal (that is, the unmodulated optical signal 1). For details, refer to the description of the first coupler 212. Details are not described herein again. For example, the second receiving module 222 is further configured to perform coherence detection, for example, perform coherence detection on the first modulated optical signal by using the unmodulated optical signal 5.

In this way, the local oscillator light used for coherence detection is the unmodulated optical signal 5 on which polarization control is performed. Because the unmodulated optical signal 5 has high energy in an expected polarization state, impact of a random polarization state change is eliminated or reduced. Therefore, accuracy of coherence detection is improved.

Optionally, the second polarization control module 227 is further connected to the second transmitting module 226 through the third circulator 225. For example, as shown in FIG. 3*b*, for the third circulator 225, three ports of the third circulator 225 are respectively connected to the second coupler 224, the second transmitting module 226, and the second polarization control module 227.

The second polarization control module 227 is further used for polarization control of the second modulated optical signal. For example, as shown in FIG. 3*b*, when the unmodulated optical signal 6 is obtained through separation, the second coupler 224 is configured to send the unmodulated optical signal 6 to the second transmitting module 226, to modulate the second modulated optical signal. For details, refer to the description of the second transmitting module 226. Details are not described herein again. The second polarization control module 227 is further configured to receive the second modulated optical signal from the second transmitting module 226 through the third circulator 225, control polarization of the second modulated optical signal, and send the second modulated optical signal on which polarization control is performed to the fourth circulator 215 of the first optical transmission apparatus 210.

In this way, for the first receiving module 216, the modulated optical signal used for coherence detection is an optical signal on which polarization control is performed, and has more energy in an expected polarization direction. The second modulated optical signal on which polarization control is performed and the unmodulated optical signal 7 on which polarization control is performed may have a same polarization state. When polarization control is also performed on the unmodulated optical signal 7 on the first optical transmission apparatus 210 side, the local oscillator light (that is, the unmodulated optical signal 7) that is used by the first receiving module 216 to perform coherence detection and the second modulated optical signal have a same polarization state. In this way, after the first receiving module 216 performs coherence detection, the electrical signal 2 may be obtained. The first DSP module 217 may obtain the information 2 based on the electrical signal 2, and does not need to perform polarization demultiplexing processing, so that system power consumption is reduced.

It should be understood that, when the coherent communication system 2000 includes the second polarization control module 227, the single-mode optical fiber 240 may also be replaced with another connection material, for example, a common fiber, to reduce system costs.

Figure 4:
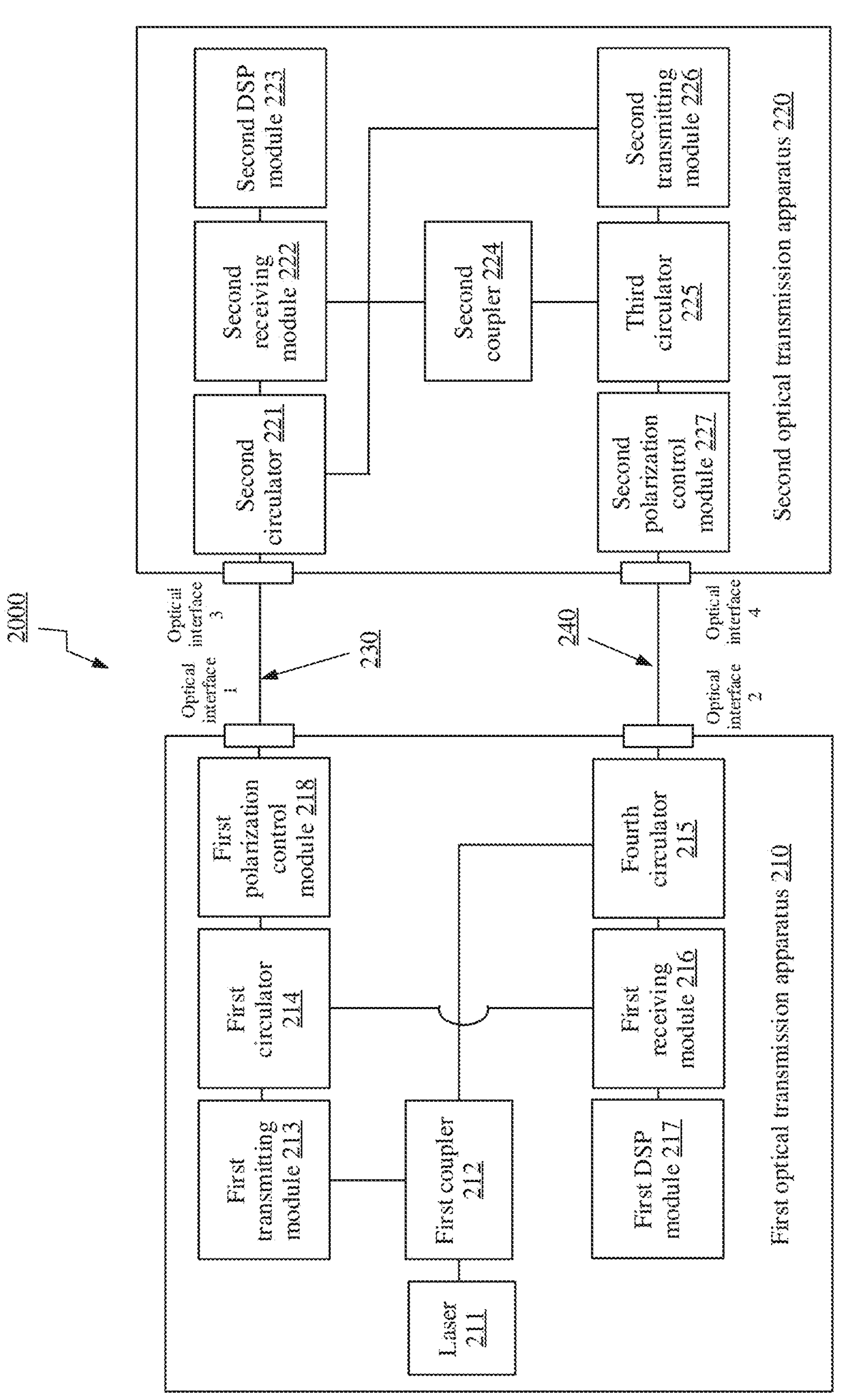
FIG. 4 is a diagram of an architecture of further another communication system according to an embodiment of this application.

In some embodiments, as shown in FIG. 4, the first optical transmission apparatus 210 further includes the first polarization control module 218, and the second optical transmission apparatus 220 further includes the second polarization control module 227. For a connection relationship between and functions of the first polarization control module 218 and another component, refer to the description in FIG. 3*a*. For a connection relationship between and functions of the second polarization control module 227 and another component, refer to the description in FIG. 3*b*. Details are not described herein again. For an unmodulated optical signal, in the communication system shown in FIG. 4, polarization of the unmodulated optical signal (that is, the unmodulated optical signal 3) in the first transmission direction can be controlled, and polarization of an unmodulated optical signal (that is, the unmodulated optical signal 7) in the second transmission direction can also be controlled, thereby eliminating or reducing impact caused by a random polarization state change, and helping improve coherence detection performance of the system. Further, for a modulated optical signal, in the communication system shown in FIG. 4, polarization of the first modulated optical signal in the first transmission direction can be controlled, and polarization of the second modulated optical signal in the second transmission direction can also be controlled, so that neither of the two optical transmission apparatuses (that is, the first optical transmission apparatus 210 and the second optical transmission apparatus 220) needs to perform polarization demultiplexing processing. This helps reduce system power consumption.

Figure 5:
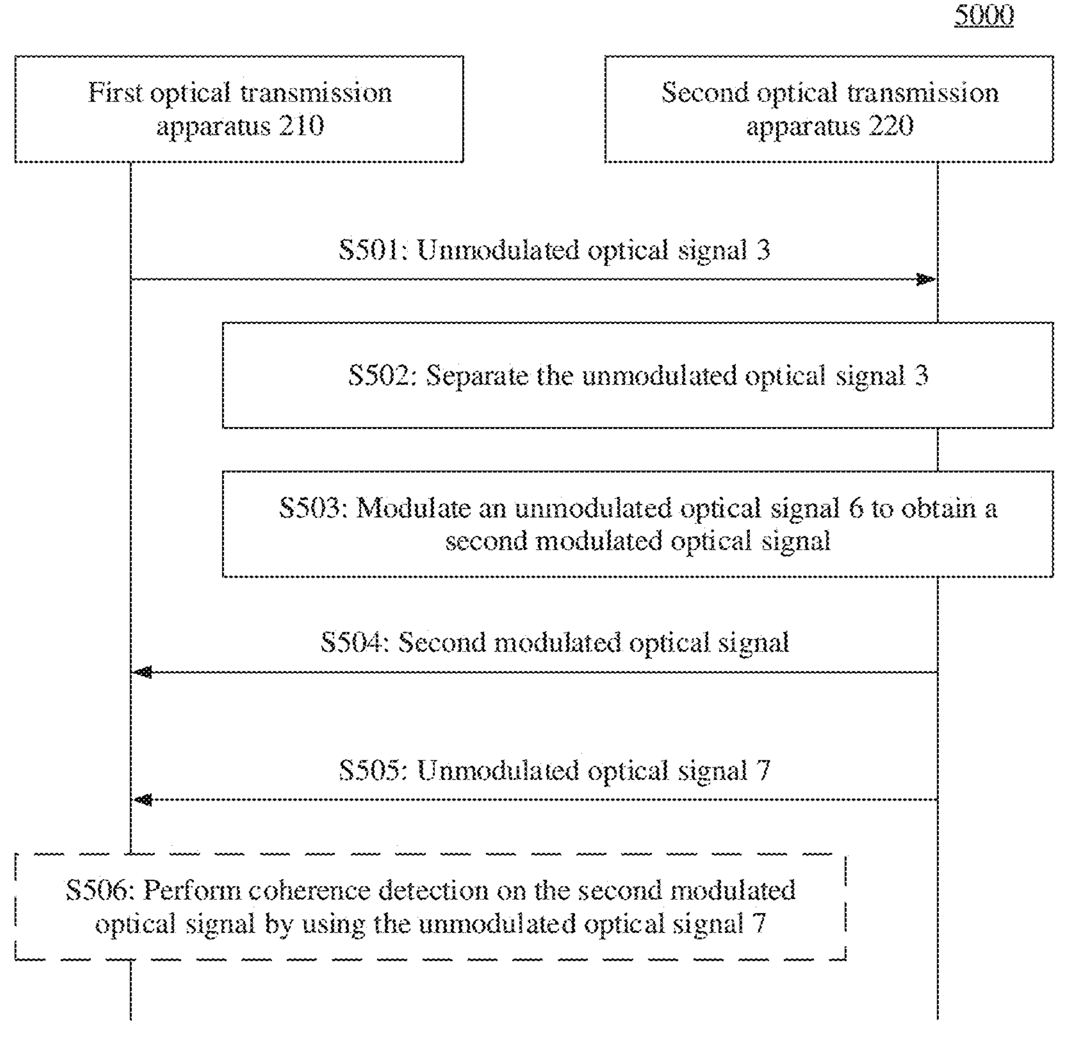
FIG. 5 is a schematic flowchart of an optical transmission method according to an embodiment of this application.

Embodiments of this application further provide a coherent optical transmission method 5000. The method is applicable to the communication system 2000 shown in FIG. 2*a*, FIG. 2*b*, FIG. 3*a*, FIG. 3*b*, or FIG. 4. As shown in FIG. 5, the optical transmission method 5000 includes the following steps.

S501: The first optical transmission apparatus 210 sends the unmodulated optical signal 3 to the second optical transmission apparatus 220. Correspondingly, the second optical transmission apparatus 220 receives the unmodulated optical signal 3 from the first optical transmission apparatus 210.

For example, refer to FIG. 2*a*. In the first optical transmission apparatus 210, the fourth circulator 215 sends an unmodulated optical signal 3 to the third circulator 225 through the optical interface 2, the single-mode optical fiber 240, and the optical interface 4. Correspondingly, in the second optical transmission apparatus 220, the third circulator 225 receives the unmodulated optical signal 3 through the optical interface 4.

For example, refer to FIG. 2*a*. In the first optical transmission apparatus 210, a process of generating the unmodulated optical signal 3 is as follows:

The laser 211 generates the unmodulated optical signal 1. The first coupler 212 receives the unmodulated optical signal 1 from the laser 211, and separates the unmodulated optical signal 1 to obtain a separation result. The separation result includes one of the following items.

item 1: an unmodulated optical signal 2 and an unmodulated optical signal 3; or item 2: an unmodulated optical signal 3.

For the separation result, refer to the description of the first coupler 212. Details are not described herein again. When the unmodulated optical signal 2 is obtained through separation, the first optical transmission apparatus 210 performs the description of S511. When the unmodulated optical signal 3 is obtained through separation, the first coupler 212 sends the unmodulated optical signal 3 to the fourth circulator 215, and then transmits the unmodulated optical signal 3 to the second optical transmission apparatus 220.

S502: The second optical transmission apparatus 220 separates the unmodulated optical signal 3.

For example, refer to FIG. 2*a*. The second coupler 224 receives the unmodulated optical signal 3 from the third circulator 225, and separates the unmodulated optical signal 3 to obtain a separation result. The separation result includes one of the following items:

item 1: an unmodulated optical signal 5, an unmodulated optical signal 6, and an unmodulated optical signal 7;

item 2: an unmodulated optical signal 5; or item 3: an unmodulated optical signal 6 and an unmodulated optical signal 7.

For the separation result, refer to the description of the second coupler 224 in FIG. 2*a*. Details are not described herein again. When the unmodulated optical signal 5 is obtained through separation, the second optical transmission apparatus 220 performs S513. When the unmodulated optical signal 6 is obtained through separation, the second optical transmission apparatus 220 performs S503. When the unmodulated optical signal 7 is obtained through separation, the second optical transmission apparatus 220 performs S505. S503 and S505 are described as follows:

S503: The second optical transmission apparatus 220 modulates the unmodulated optical signal 6 to obtain the second modulated optical signal.

For example, refer to FIG. 2*a*. The second transmitting module 226 receives the unmodulated optical signal 6 from the second coupler 224, and modulates the unmodulated optical signal 6 to obtain the second modulated optical signal. For details, refer to the description of the second transmitting module 226 in FIG. 2*a*. Details are not described herein again.

S504: The second optical transmission apparatus 220 sends the second modulated optical signal to the first optical transmission apparatus 210. Correspondingly, the first optical transmission apparatus 210 receives the second modulated optical signal from the second optical transmission apparatus 220.

For example, refer to FIG. 2*a*. The second transmitting module 226 sends the second modulated optical signal to the third circulator 225, and the third circulator 225 sends the second modulated optical signal to the optical interface 4, so that the second modulated optical signal is transmitted to the fourth circulator 215 of the first optical transmission apparatus 210 through the single-mode optical fiber 240. Correspondingly, the fourth circulator 215 receives the second modulated optical signal through the optical interface 2.

S505: The second optical transmission apparatus 220 sends the unmodulated optical signal 7 to the first optical transmission apparatus 210. Correspondingly, the first optical transmission apparatus 210 receives the unmodulated optical signal 7 from the second optical transmission apparatus 220.

For example, refer to FIG. 2*a*. The second coupler 224 sends the unmodulated optical signal 7 to the second circulator 221, and the second circulator 221 sends the unmodulated optical signal 7 to the optical interface 3, so that the unmodulated optical signal 7 is transmitted to the first circulator 214 of the first optical transmission apparatus 210 through the single-mode optical fiber 230. Correspondingly, the first circulator 214 receives the unmodulated optical signal 7 through the optical interface 1.

Optionally, for the first optical transmission apparatus 210, after S504 and S505 are performed, S506 is performed.

S506: The first optical transmission apparatus 210 performs coherence detection on the second modulated optical signal by using the unmodulated optical signal 7.

For example, refer to FIG. 2*a*. The first receiving module 216 receives the unmodulated optical signal 7 from the first circulator 214, and uses the unmodulated optical signal 7 as local oscillator light. The first receiving module 216 further receives the second modulated optical signal from the fourth circulator 215, and performs coherence detection on the second modulated optical signal by using the unmodulated optical signal 7, to obtain the electrical signal 2. For details, refer to the description of the first receiving module 216 in FIG. 2*a*. Then, the first DSP module 217 processes the electrical signal 2 to obtain the information 2. For details, refer to the description of the first DSP module 217 in FIG. 2*a*. Details are not described herein again.

In the optical transmission method 5000 in embodiments of this application, the second optical transmission apparatus 220 transmits the second modulated optical signal and the unmodulated optical signal 7 to the first optical transmission apparatus 210. Therefore, transmission paths of the second modulated optical signal and the unmodulated optical signal 7 are the same or close. The second modulated optical signal is obtained by modulating the unmodulated optical signal 6, and the unmodulated optical signal 6 and the unmodulated optical signal 7 are obtained by separating a same optical signal provided by the first optical transmission apparatus 210, that is, the unmodulated optical signal 3. In addition, the transmission paths of the second modulated optical signal and the unmodulated optical signal 7 are the same or close. Therefore, the two signals do not have a frequency difference, and belong to coherent light. This reduces or even eliminates phase noise.

Figures 6, 7:
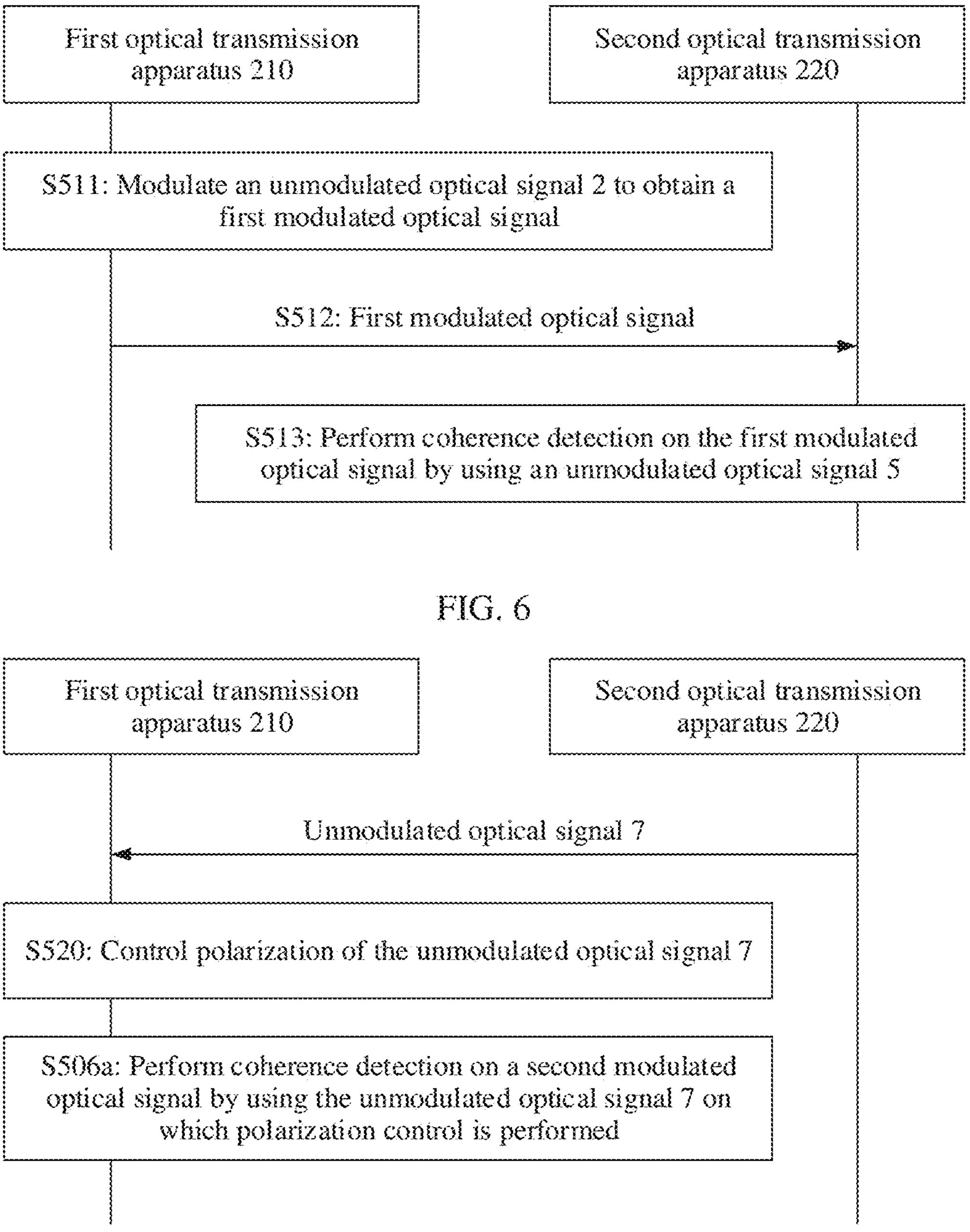
FIG. 6 is a schematic flowchart of another optical transmission method according to an embodiment of this application.
FIG. 7 is a schematic flowchart of still another optical transmission method according to an embodiment of this application.

The foregoing describes only the second modulated optical signal in terms of modulation, transmission, and demodulation. Optionally, the following describes the first modulated optical signal in terms of modulation, transmission, and coherence detection. Refer to FIG. 6. The coherent optical transmission method 5000 in embodiments of this application further includes the following.

S511: The first optical transmission apparatus 210 modulates the unmodulated optical signal 2 to obtain the first modulated optical signal.

For example, refer to FIG. 2*a*. When the unmodulated optical signal 2 is obtained through separation, the first transmitting module 213 receives the unmodulated optical signal 2 from the first coupler 212, and modulates the unmodulated optical signal 2 to obtain the first modulated optical signal. For details, refer to the description of the first transmitting module 213 in FIG. 2*a*. Details are not described herein again.

S512: The first optical transmission apparatus 210 sends the first modulated optical signal to the second optical transmission apparatus 220. Correspondingly, the second optical transmission apparatus 220 receives the first modulated optical signal from the first optical transmission apparatus 210.

For example, refer to FIG. 2*a*. The first transmitting module 213 sends the first modulated optical signal to the first circulator 214, and the first circulator 214 sends the first modulated optical signal to the optical interface 1, so that the first modulated optical signal is transmitted to the second circulator 221 of the second optical transmission apparatus 220 through the single-mode optical fiber 230. Correspondingly, the second circulator 221 receives the first modulated optical signal through the optical interface 3.

S513: The second optical transmission apparatus 220 performs coherence detection on the first modulated optical signal by using the unmodulated optical signal 5.

For example, refer to FIG. 2*a*. The second receiving module 222 receives the unmodulated optical signal 5 from the second coupler 224, and uses the unmodulated optical signal 5 as local oscillator light. The second receiving module 222 further receives the first modulated optical signal from the second circulator 221, and performs coherence detection on the first modulated optical signal by using the unmodulated optical signal 5, to obtain the electrical signal 1. Then, the second DSP module 223 processes the electrical signal 1 to obtain the information 1.

In some embodiments, as shown in FIG. 7, the coherent optical transmission method 5000 in embodiments of this application further includes the following.

S520: The first optical transmission apparatus 210 controls polarization of the unmodulated optical signal 7.

For example, refer to FIG. 3*a*. After receiving the unmodulated optical signal 7 through the optical interface 1, the first polarization control module 218 converts a polarization state of the unmodulated optical signal 7 into an expected polarization state. For details, refer to the description of the first polarization control module 218 in FIG. 3*a*, and details are not described herein again.

When S520 is performed, S506 may be replaced with S506*a*.

S506*a*: The first optical transmission apparatus 210 performs coherence detection on the second modulated optical signal by using the unmodulated optical signal 7 on which polarization control is performed.

For example, the first receiving module 216 receives, through the first circulator 214, the unmodulated optical signal 7 that is from the first polarization control module 218 and on which polarization control is performed, to use the unmodulated optical signal 7 as the local oscillator light to perform coherence detection on the second modulated optical signal.

In this way, the local oscillator light used for coherence detection is the unmodulated optical signal 7 on which polarization control is performed. Because the unmodulated optical signal 7 has high energy in an expected polarization state, impact of a random polarization state change is eliminated or reduced. Therefore, accuracy of coherence detection is improved.

Figures 8, 9:
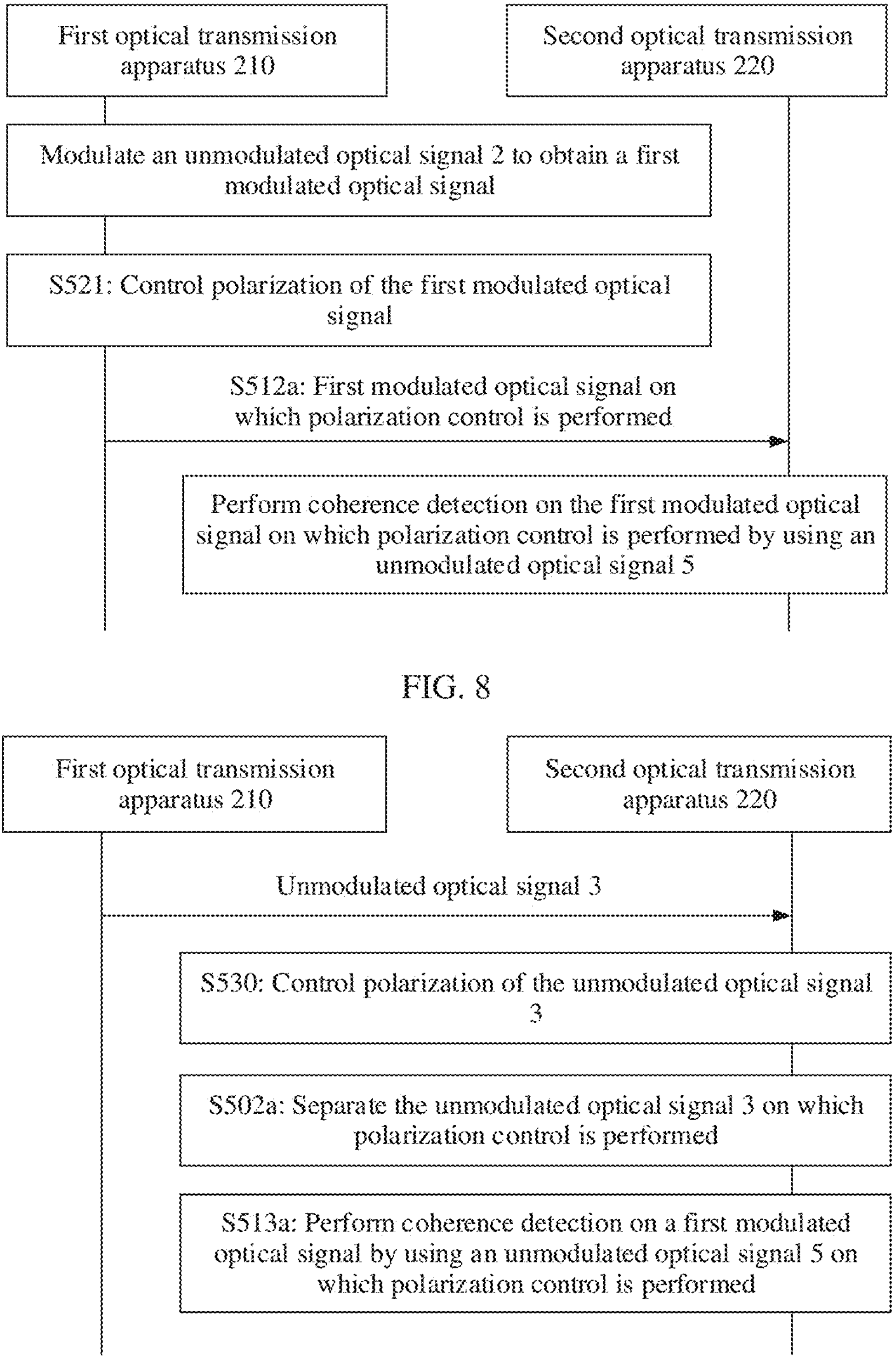
FIG. 8 is a schematic flowchart of yet another optical transmission method according to an embodiment of this application.
FIG. 9 is a schematic flowchart of still yet another optical transmission method according to an embodiment of this application.

Optionally, as shown in FIG. 8, the coherent optical transmission method 5000 in embodiments of this application further includes the following steps:

S521: The first optical transmission apparatus 210 controls polarization of the first modulated optical signal.

For example, refer to FIG. 3*a*. After generating the first modulated optical signal, the first transmitting module 213 sends the first modulated optical signal to the first polarization control module 218 through the first circulator 214. The first polarization control module 218 controls polarization of the first modulated optical signal, so that the first modulated optical signal on which polarization control is performed has more energy in an expected polarization direction.

When S521 is performed, S512 may be replaced with S512*a*.

S512*a*: The first optical transmission apparatus 210 sends the first modulated optical signal on which polarization control is performed to the second optical transmission apparatus 220. Correspondingly, the second optical transmission apparatus 220 receives the first modulated optical signal on which polarization control is performed from the first optical transmission apparatus 210.

For example, refer to FIG. 3*a*. The first polarization control module 218 transmits, through the optical interface 1 and the single-mode optical fiber 230, the first modulated optical signal on which polarization control is performed. Correspondingly, the second circulator 221 receives the first modulated optical signal on which polarization control is performed through the optical interface 3, and provides the first modulated optical signal on which polarization control is performed to the second receiving module 222.

When polarization control is also performed on the unmodulated optical signal 3 on a second optical transmission apparatus 220 side, the local oscillator light (that is, the unmodulated optical signal 5) that is used by the second receiving module 222 to perform coherence detection and the first modulated optical signal have a same polarization state. In this way, after the second receiving module 222 performs coherence detection, the electrical signal 1 may be obtained. The second DSP module 223 may obtain the information 1 based on the electrical signal 1, and does not need to perform polarization demultiplexing processing, so that system power consumption is reduced.

In some embodiments, as shown in FIG. 9, the optical transmission method 5000 in embodiments of this application further includes the following steps:

S530: The second optical transmission apparatus 220 controls polarization of the unmodulated optical signal 3.

For example, refer to FIG. 3*b*. After receiving the unmodulated optical signal 3 through the optical interface 4, the second polarization control module 227 converts a polarization state of the unmodulated optical signal 3 into an expected polarization state. For details, refer to the description of the second polarization control module 227 in FIG. 3*b*, and details are not described herein again.

When S530 is performed, S502 may be replaced with S502*a*.

S502*a*: The second optical transmission apparatus 220 separates the unmodulated optical signal 3 on which polarization control is performed.

Because the unmodulated optical signal 6, the unmodulated optical signal 7, and the unmodulated optical signal 5 are obtained by separating the unmodulated optical signal 3 on which polarization control is performed, the unmodulated optical signal 6, the unmodulated optical signal 7, and the unmodulated optical signal 5 have a same polarization state as the unmodulated optical signal 3 on which polarization control is performed.

Optionally, for the second optical transmission apparatus 220, when the unmodulated optical signal 5 is obtained through separation, S513 may be replaced with S513*a*.

S513*a*: The second optical transmission apparatus 220 performs coherence detection on the first modulated optical signal by using the unmodulated optical signal 5 on which polarization control is performed.

For example, the second receiving module 222 receives the first modulated optical signal from the first optical transmission apparatus 210 through the second circulator 221, and performs coherence detection on the first modulated optical signal by using the unmodulated optical signal 5 on which polarization control is performed. For details, refer to the description of the second receiving module 222 in FIG. 3*b*. Details are not described herein again.

In this way, the local oscillator light used for coherence detection is the unmodulated optical signal 5 on which polarization control is performed. Because the unmodulated optical signal 5 has high energy in an expected polarization state, impact of a random polarization state change is eliminated or reduced, and accuracy of coherence detection is improved.

Figure 10:
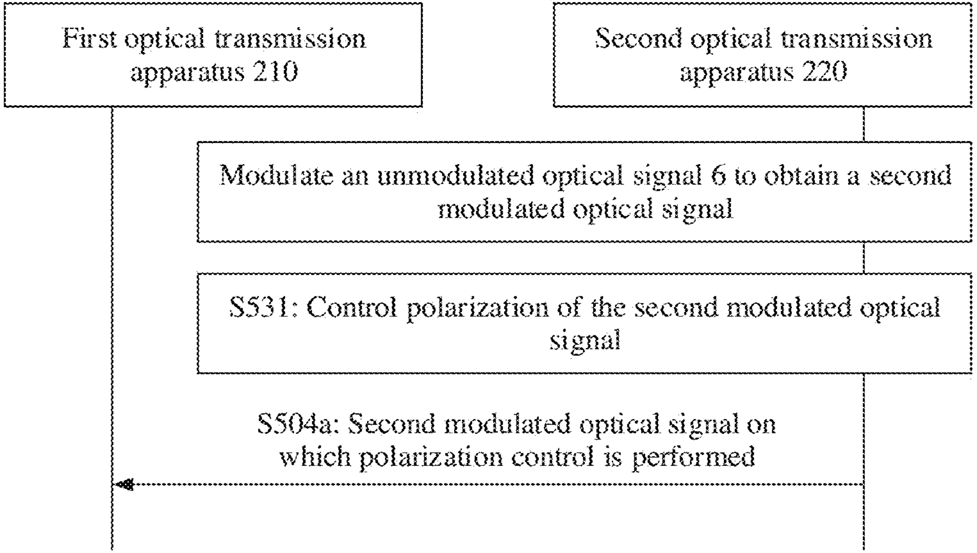
FIG. 10 is a schematic flowchart of further another optical transmission method according to an embodiment of this application.

Optionally, as shown in FIG. 10, the optical transmission method 5000 in embodiments of this application further includes the following.

S531: The second optical transmission apparatus 220 controls polarization of the second modulated optical signal.

For example, refer to FIG. 3*b*. After generating the second modulated optical signal, the second transmitting module 226 sends the second modulated optical signal to the second polarization control module 227 through the third circulator 225. The second polarization control module 227 controls polarization of the second modulated optical signal, so that the second modulated optical signal on which polarization control is performed has more energy in an expected polarization direction.

When S531 is performed, S504 may be replaced with S504*a*.

S504*a*: The second optical transmission apparatus 220 sends the second modulated optical signal on which polarization control is performed to the first optical transmission apparatus 210. Correspondingly, the first optical transmission apparatus 210 receives the second modulated optical signal on which polarization control is performed from the second optical transmission apparatus 220.

For example, refer to FIG. 3*b*. The second polarization control module 227 transmits, through the optical interface 4 and the single-mode optical fiber 240, the second modulated optical signal on which polarization control is performed. Correspondingly, the fourth circulator 215 receives, through the optical interface 2, the second modulated optical signal on which polarization control is performed, and provides the second modulated optical signal on which polarization control is performed to the first receiving module 216.

In this way, the second modulated optical signal on which polarization control is performed and the unmodulated optical signal 7 on which polarization control is performed may have a same polarization state. When polarization control is also performed on the unmodulated optical signal 7 on the first optical transmission apparatus 210 side, the local oscillator light (that is, the unmodulated optical signal 7) that is used by the first receiving module 216 to perform coherence detection and the second modulated optical signal have a same polarization state. In this way, after the first receiving module 216 performs coherence detection, the electrical signal 2 may be obtained. The first DSP module 217 may obtain the information 2 based on the electrical signal 2, and does not need to perform polarization demultiplexing processing, so that system power consumption is reduced.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A first optical transmission apparatus, comprising:
- a first circulator, configured to receive a second unmodulated optical signal from a second optical transmission apparatus; and
- a first receiver, connected to the first circulator, and configured to:
  - receive a second modulated optical signal from the second optical transmission apparatus; and
  - receive the second unmodulated optical signal from the first circulator, wherein the second modulated optical signal is obtained by modulating a first unmodulated optical signal, the second unmodulated optical signal is used to perform coherence detection on the second modulated optical signal, the first unmodulated optical signal and the second unmodulated optical signal are obtained by separating a third unmodulated optical signal, and the third unmodulated optical signal is provided by the first optical transmission apparatus to the second optical transmission apparatus.

2. The first optical transmission apparatus according to claim 1, wherein the first circulator is further connected to a second circulator, and the second optical transmission apparatus comprises the second circulator; and
- wherein the first circulator being configured to receive the second unmodulated optical signal from the second optical transmission apparatus comprises the first circulator being configured to: receive the second unmodulated optical signal from the second circulator.

3. The first optical transmission apparatus according to claim 1, further comprising:
- a first polarization controller, connected to the first circulator, wherein the first polarization controller is configured to control polarization of the second unmodulated optical signal, to obtain the second unmodulated optical signal on which polarization control is performed.

4. The first optical transmission apparatus according to claim 3, wherein the second unmodulated optical signal being used to perform coherence detection on the second modulated optical signal comprises:
- the second unmodulated optical signal on which polarization control is performed is used to perform coherence detection on the second modulated optical signal.

5. The first optical transmission apparatus according to claim 3, wherein the first polarization controller is further configured to control polarization of a first modulated optical signal, wherein the first modulated optical signal is sent by the first optical transmission apparatus to the second optical transmission apparatus.

6. The first optical transmission apparatus according to claim 5, further comprising:
- a first transmitter, connected to the first circulator, and configured to send the first modulated optical signal to the first polarization controller through the first circulator.

7. The first optical transmission apparatus according to claim 1, wherein:
- the first optical transmission apparatus is on an active antenna unit (AAU) side, and the second optical transmission apparatus is on a baseband unit (BBU) side; or
- the first optical transmission apparatus is on a BBU side, and the second optical transmission apparatus is on an AAU side.

8. A second optical transmission apparatus, comprising:
- a second coupler, configured to separate a third unmodulated optical signal into at least a first unmodulated optical signal and a second unmodulated optical signal, wherein the third unmodulated optical signal is provided by a first optical transmission apparatus;
- a second transmitter, connected to the second coupler, and configured to send a second modulated optical signal to the first optical transmission apparatus, wherein the second modulated optical signal is obtained by modulating the first unmodulated optical signal; and a second circulator, connected to the second coupler, and configured to receive the second unmodulated optical signal from the second coupler, and send the second unmodulated optical signal to the first optical transmission apparatus, wherein the second unmodulated optical signal is used for coherence detection of the second modulated optical signal.

9. The second optical transmission apparatus according to claim 8, wherein the second circulator is further connected to a first circulator, and the first optical transmission apparatus comprises the first circulator; and wherein the second circulator being configured to send the second unmodulated optical signal to the first optical transmission apparatus comprises the second circulator being configured to: send the second unmodulated optical signal to the first circulator.

10. The second optical transmission apparatus according to claim 8, further comprising:

a second polarization controller, connected to the second coupler, and configured to control polarization of the third unmodulated optical signal.

11. The second optical transmission apparatus according to claim 10, wherein the second coupler being configured to separate the third unmodulated optical signal into at least the first unmodulated optical signal and the second unmodulated optical signal comprises the second coupler being configured to:

separate the third unmodulated optical signal on which polarization control is performed into at least the first unmodulated optical signal and the second unmodulated optical signal.

12. The second optical transmission apparatus according to claim 10, wherein the second coupler is further configured to separate the third unmodulated optical signal on which polarization control is performed into a fifth unmodulated optical signal, the fifth unmodulated optical signal is used for coherence detection of a first modulated optical signal, and the first modulated optical signal is transmitted by the first optical transmission apparatus to the second optical transmission apparatus.

13. The second optical transmission apparatus according to claim 12, further comprising:

a second receiver, connected to both the second circulator and the second coupler, and configured to receive the first modulated optical signal from the first optical transmission apparatus through the second circulator, and receive the fifth unmodulated optical signal from the second coupler.

14. The second optical transmission apparatus according to claim 10, wherein the second polarization controller is further connected to the second transmitter, and is configured to control polarization of the second modulated optical signal.

15. The second optical transmission apparatus according to claim 14, further comprising:

a third circulator;

wherein the second polarization controller being connected to the second coupler comprises:

the second polarization controller being connected to the second coupler through the third circulator; and wherein the second polarization controller being further connected to the second transmitter comprises:

the second polarization controller being further connected to the second transmitter through the third circulator.

16. The second optical transmission apparatus according to claim 8, wherein:

the first optical transmission apparatus is on an active antenna unit (AAU) side, and the second optical transmission apparatus is on a baseband unit (BBU) side; or the first optical transmission apparatus is on a BBU side, and the second optical transmission apparatus is on an AAU side.

17. A method, applied to a first optical transmission apparatus, the first optical transmission apparatus comprising a first circulator and a first receiver, and the method comprises:

receiving, by the first circulator, a second unmodulated optical signal from a second optical transmission apparatus; and receiving, by the first receiver, a second modulated optical signal from the second optical transmission apparatus, and receiving the second unmodulated optical signal from the first circulator, wherein the second modulated optical signal is obtained by modulating a first unmodulated optical signal, the second unmodulated optical signal is used to perform coherence detection on the second modulated optical signal, the first unmodulated optical signal and the second unmodulated optical signal are obtained by separating a third unmodulated optical signal, and the third unmodulated optical signal is provided by the first optical transmission apparatus to the second optical transmission apparatus.

18. The method according to claim 17, wherein receiving, by the first circulator, the second unmodulated optical signal from the second optical transmission apparatus comprises:

receiving, by the first circulator, the second unmodulated optical signal from a second circulator, wherein the first circulator is further connected to the second circulator, and the second optical transmission apparatus comprises the second circulator.

19. The method according to claim 17, further comprising:

controlling, by a first polarization controller, polarization of the second unmodulated optical signal, wherein the first optical transmission apparatus further comprises the first polarization controller, and the first polarization controller is connected to the first circulator.

20. The method according to claim 19, wherein that the second unmodulated optical signal is used to perform coherence detection on the second modulated optical signal comprises: the second unmodulated optical signal on which polarization control is performed is used to perform coherence detection on the second modulated optical signal.

* * * * *